US012770025B2

(12) United States Patent
Helterhoff et al.

(10) Patent No.: US 12,770,025 B2
(45) Date of Patent: Oct. 20, 2026

(54) PREDICTION MODEL FOR PREDICTING PRODUCT QUALITY PARAMETER VALUES

(71) Applicants: thyssenkrupp Uhde GmbH, Dortmund (DE); thyssenkrupp AG, Essen (DE)

(72) Inventors: Robert Helterhoff, Berlin (DE); Heinrich Koch, Kleinmachnow (DE); Matthias Schoennagel, Berlin (DE); Christopher Seibel, Essen (DE); Georg Sieber, Munich (DE); Mylène Speisser, Berlin (DE); Sophie Ruoshan Wei, Munich (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 578 days.

(21) Appl. No.: 18/276,967

(22) PCT Filed: Feb. 11, 2022

(86) PCT No.: PCT/EP2022/053351
§ 371 (c)(1),
(2) Date: Aug. 11, 2023

(87) PCT Pub. No.: WO2022/171788
PCT Pub. Date: Aug. 18, 2022

(65) Prior Publication Data

US 2024/0144043 A1 May 2, 2024

(30) Foreign Application Priority Data

Feb. 11, 2021 (DE) ..................... 10 2021 201 296.5

(51) Int. Cl.
*G06N 5/022* (2023.01)

(52) U.S. Cl.
CPC .................................... *G06N 5/022* (2013.01)

(58) Field of Classification Search
CPC ............................ G06N 5/022; G05B 13/0265
See application file for complete search history.

(56) References Cited

U.S. PATENT DOCUMENTS

| | | | | |
|---|---|---|---|---|
| 5,212,765 | A | 5/1993 | Skeirik | |
| 2013/0069792 | A1 | 3/2013 | Blevins et al. | |
| 2021/0096518 | A1 * | 4/2021 | Ilani | G06N 3/045 |

FOREIGN PATENT DOCUMENTS

| | | | |
|---|---|---|---|
| DE | 691 25 809 | T2 | 12/1997 |

OTHER PUBLICATIONS

English Translation of International Search Report issued in PCT/EP2022/053351, dated Jun. 28, 2022.

* cited by examiner

*Primary Examiner* — Maher N Algibhah
(74) *Attorney, Agent, or Firm* — thyssenkrupp North America, LLC

(57) ABSTRACT

A method for training a machine-learning module of a computer-implemented prediction model for predicting product quality parameter values for one or more quality parameters of a chemical product produced by a chemical production plant. The production plant includes a plurality of sensors, each of which is configured to acquire process parameter values for one or more process parameters of a chemical process carried out by the production plant for producing the chemical product during operation of the production plant. A priori information about the production plant and the process carried out by the production plant is used, including chronological sequence information about a chronological sequence of the process carried out within the production plant, for which sensors sensor-specific time shifts between an acquisition time of training process parameter values and a production time of a product unit, during (Continued)

the production of which the corresponding training process parameter value was acquired.

25 Claims, 14 Drawing Sheets

PREDICTION MODEL FOR PREDICTING PRODUCT QUALITY PARAMETER VALUES

CROSS REFERENCE TO RELATED APPLICATIONS

This application is a U.S. National Stage Entry of International Patent Application Serial Number PCT/EP2022/053351, filed Feb. 11, 2022, which claims priority to German Patent Application No. DE 10 2021 201 296.5, filed Feb. 11, 2021, the entire contents of which are incorporated herein by reference.

FIELD

The present disclosure generally relates to a method for training a machine-learning module of a computer-implemented prediction model for predicting product quality parameter values for one or more quality parameters of a chemical product produced by a chemical production plant.

BACKGROUND

The quality of products produced in chemical production plants, in particular large-scale chemical production plants, is influenced by a variety of process parameters in a complex, non-linear manner which is therefore difficult to predict. In particular, it is extremely difficult to make accurate quantitative statements about the quality of the resulting products. The actual quality of the products can generally only be determined by retrospective laboratory analysis. Using modern high-performance computer systems, procedures for machine learning ("machine learning methods") enable prediction models to be provided for the results of complex, non-linear procedures.

In a machine learning process (see, for example, "Machine Learning" in Wikipedia; https://en.wikipedia.org/wiki/Machine_learning), an artificial system learns from examples and can generalize them once the learning phase has been completed. To this end, machine learning algorithms build a statistical model based on training data. This means that the examples are not simply learned by rote, but patterns and regularities are recognized in the training data. This allows the system to evaluate unknown data.

However, the learning success or quality of the predictions of such procedures depends to a large extent on the quality and extent of the training data used for training. In the case of chemical production plants, in particular complex large-scale chemical production plants, with a potentially large number of subsystems, the training data available is generally limited as for many reasons it is either impossible or unrealistic to carry out lengthy and extensive test runs for collecting data which adequately represents all possible operating conditions of the plants. Not least since such test runs would have to be repeated every time the plant is modified and even when plant components are replaced.

Due to these limitations, available prediction models based on machine learning methods are either too imprecise in their predictions or too specific, by being capable of making accurate predictions only for specific operating conditions.

Thus a need exists for an improved method for training machine learning modules for predicting product quality parameter values for chemical products produced by chemical production plants.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
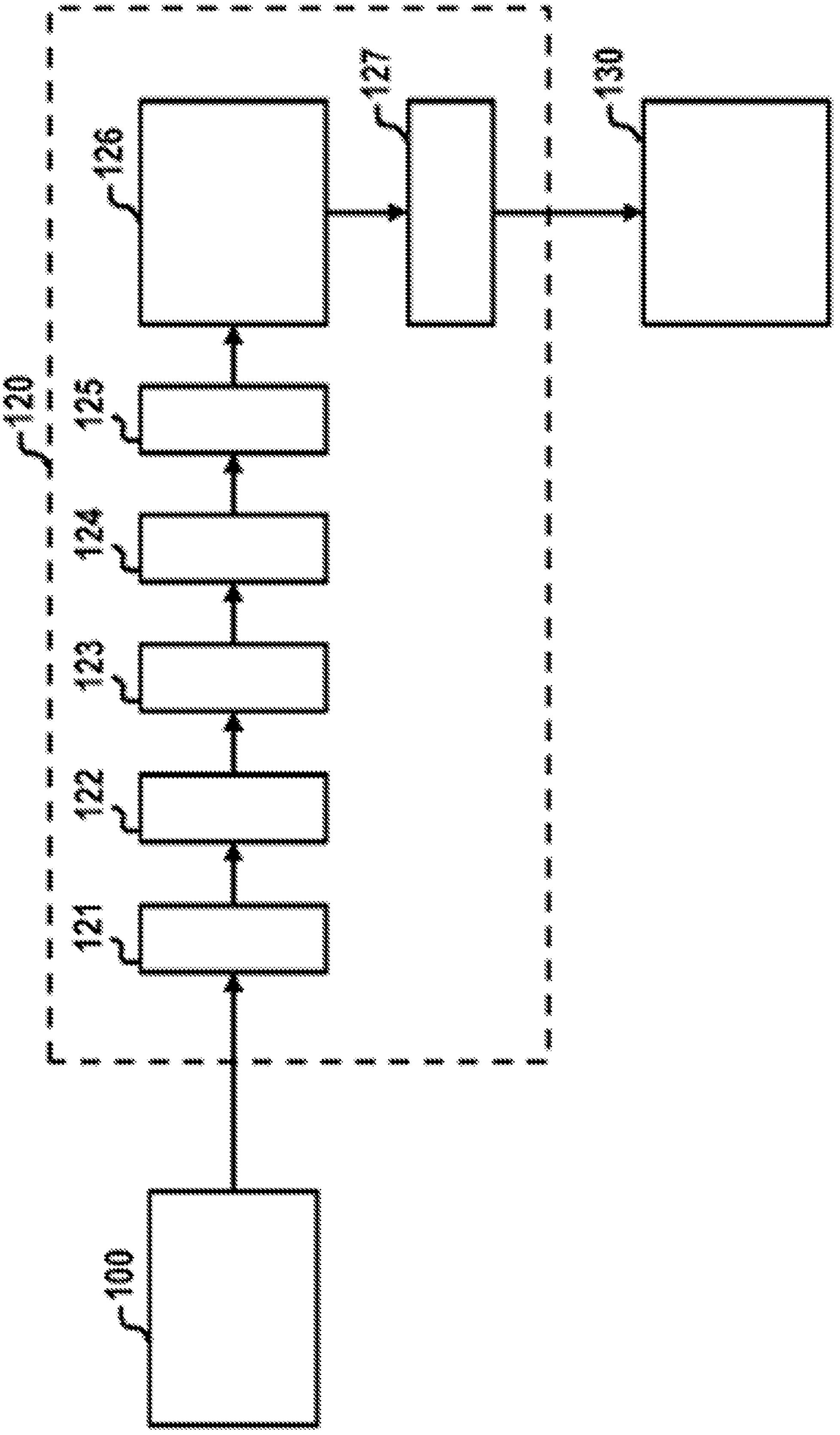
FIG. 1 shows a schematic diagram of a prediction model according to the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure relates to a method for training a machine-learning module of a computer-implemented prediction model for predicting product quality parameter values for one or more quality parameters of a chemical product produced by a chemical production plant. The disclosure also relates to a method for predicting corresponding product quality parameter values using the computer-implemented prediction model with the trained machine learning module. Finally, the disclosure also relates to computer systems for carrying out the training and prediction methods.

Embodiments include a method for training a machine learning module of a computer-implemented prediction model for predicting product quality parameter values for one or more quality parameters of a chemical product produced by a chemical production plant, wherein the production plant comprises a plurality of sensors which are each configured to acquire, during the operation of the production plant, process parameter values for one or more process parameters of a chemical process carried out by the production plant for producing the chemical product, the method comprising:

providing training data, wherein the training data for a plurality of product units produced by the production plant comprises product quality parameter values determined for each of one or more quality parameters of the respective product unit as training product quality parameter values, wherein the training product quality parameter values are each assigned a production time of the product unit for which they were determined, wherein the training data further comprises a plurality of process parameter values from each of the sensors as training process parameter values which were acquired during the production of the product units for which the training product quality parameter values were determined, wherein the training process parameter values are each assigned an acquisition time and an identifier of the acquiring sensor, providing a priori information about the production plant and the process carried out by the production plant, wherein the a priori information includes chronological sequence information about a chronological sequence of the process carried out within the production plant, for each of the sensors, determining a sensor-specific time shift between an acquisition time of one of the training process parameter values acquired by the corresponding sensor and a production time of the product unit, during the production of which the corresponding training process parameter value was acquired, the determination being carried out in each case using the chronological sequence information, with the determined sensor-specific time shifts of the sensors being assigned in each case to the training process parameter values acquired by the respective sensor, assigning the training process parameter values to the one or more training product quality parameter values of one of the product units, during the production process of which the respective training process parameter value was acquired, using the acquisition time of the respective training process parameter value, the sensor-specific time shift of the sensor acquiring the respective training process parameter value, and the production time of the respective product unit, training the machine learning module using the training process parameter values and training product quality parameter values assigned to each other, wherein the respective training product quality parameter values are used to provide output data and the respective assigned training process parameter values are used to provide input data of the machine learning module for the training.

Embodiments may have the advantage that time shifts between the acquisition times at which the individual sensors acquire the training process parameter values and the production time, such as the time at which the production of the product unit is completed, i.e. the end of the production process, can be effectively taken into account. Appropriate time delays can be based on the chronological processing sequence, i.e. the order and duration of individual process steps, but can also be due to the structure of the production plant. For example, corresponding time delays can depend on transport routes and transport capacities within the production plant. For example, processing and/or reaction speeds, heating and/or cooling speeds, as well as pipe lengths, pipe cross-sections and/or flow rate or throughput rates can affect the time delay. In principle, a machine learning module, such as an artificial neural network, can also learn the influence of such time delays, but this would require such extensive amounts of training data as are not realistically available. Therefore, despite a limited amount of training data which can be obtained, for example, during test runs of the production plant, in particular a limited number of test runs, and subsequent analysis of the resulting products, e.g. in a laboratory, embodiments of the disclosure also enable an efficient training of the machine learning module so that the prediction model will be capable of making accurate predictions of the product quality of the products produced by the production plant.

Thus, unlike other machine learning algorithms, embodiments are able to achieve high accuracy and generalization capabilities in real-world applications, even if only a limited amount and variability of historical data is available. The machine learning module trained in this way enables precise predictions about the quality of intermediate and end products produced in production plants, such as polymer production plants, to be achieved in real time from measured process data from the corresponding production plants. Real-time predictions mean that the corresponding predictions are made, for example, still during the production process, i.e. before the production of the corresponding intermediate and end products, the quality of which is being predicted, is completed. If necessary, this makes it possible, for example, to intervene in the production process while the production of the corresponding intermediate and end products is still ongoing and to influence the quality of the intermediate and end products. Even if such predictions are not available, for example, until the end of production, they can have the advantage of providing a statement about the quality of the intermediate and end products directly, without first requiring additional time-consuming laboratory tests.

The product quality of a product is defined by a group of product quality parameters which are described by quantitative values of the material properties of the corresponding product, such as viscosity, purity, turbidity, color scale, etc. In addition, parameters such as the product composition, product components, pH value, phase distribution/proportions, hardness, (grain) size distribution and/or density play a role.

Process parameter values describe process parameters, i.e. process state parameters that describe the state of a process, as well as process control parameters that describe the control of settings of a production plant or of plant components of the corresponding production plant. Process parameters are measured by various sensors in the plant during operation to produce a product and can include, for example, concentrations and flow rates of raw materials and additives, temperatures, pressures, valve settings, rotational speeds, energies, volumes, weights, etc. In addition, mass flow rates, volume flow rates, fill levels, density and/or masses can also be important process parameter values.

For example, a production process can be a continuous or discontinuous process. In a discontinuous batch process, a product unit refers to a batch or a predefined subset of a batch. In the case of a continuous process, a product unit is a predefined subset, which is extracted, for example, as a random sample from the continuously manufactured product or product stream.

The proposed method is based on machine learning, in which a prediction model is trained with sets of training data. The training data comprises historical data acquired during the operation of the production plant, for example test operation and/or normal operation. This historical data includes firstly, for example, process data describing process parameters, and secondly, product quality data resulting from this process data that describes product quality parameters. This product quality data is, for example, data from offline laboratory measurements of the manufactured products.

Embodiments may have the advantage of solving the fundamental problem of a lack of extensive training datasets with process data and product quality data collected under real-world conditions. Embodiments integrate engineering expertise relating to the underlying process, such as a physico-chemical process, and to the plant design specifically as prior knowledge in modeling and training methods to provide a trained prediction model based on artificial intelligence (AI). After successful training, the resulting prediction model is able to accurately map complex and dynamic relationships between plant operation and resulting product quality.

The prediction model with the trained machine learning module can be used, for example, for effective and accurate data-based online product quality prediction for industrial chemical production plants. To this end, plant planning and engineering knowledge about process and plant-specific time delays between operation and product is combined with techniques from data analytics and machine learning. Further information can also be used, such as control parameters, ranges of control parameters, etc.

Industrial production processes, such as polymer production processes, have a highly complex, non-linear dependence between the operating parameters or process control parameters of the process and properties of the resulting product. For example, the quality of a polymer end product is determined by its material properties, such as viscosity, color and/or purity, which in turn determine the grade of the product. For example, different quality grades of the same product result in different usage options and/or prices. Therefore, monitoring, controlling, and optimizing product quality is critical to the overall performance and profitability of a production plant, such as a polymer production plant.

According to embodiments, the method can be used, for example, to determine the fill level on absorber bases of a nitric acid system. It is also conceivable that the speed of compressor shafts of such a system could be monitored. Another application can be the monitoring of pressures in, before and after compressors or compactors. In the specific application of residual gas treatment, the method could be applied, for example, for the gas composition before and after a DeNOx/DeN2O reactor. Temperatures in NH3 converters can also be monitored using the method.

According to embodiments, the sensor-specific time shifts of one or more of the sensors are dependent on training process parameter values which have been detected by one or more sensors downstream in the process sequence, and the corresponding training process parameter values are used in each case for determining the respective sensor-specific time shifts dependent on them.

Embodiments may have the advantage that dynamic effects of the plant control and process settings can also be taken into account. For example, pipe lengths and diameters are known constant values of the production plant. However, a resulting transport time of process components may also depend, for example, on measured process parameter values, such as a flow rate of the process components transported through the corresponding pipes.

According to embodiments, the production times of the product units each concerns a completion time of the process carried out by the production plant for producing the corresponding product unit.

According to embodiments, the method further comprises cleaning the training process parameter values provided, wherein the cleaning comprises one or more of the following data processing steps:

removing outlier values from the training process parameter values, removing non-physical values from the training process parameter values, and/or adding missing training process parameter values, wherein in order to identify missing training process parameters the training data is checked for completeness using a priori completeness information, which defines from which sensors of the production plant and for which process parameters the training data should include training process parameter values.

Embodiments may have the advantage that the training process parameter values, which involve sensor values acquired in the operation of the production plant, have a higher quality and thus enable a more effective learning of the machine-learning module.

Non-physical values refer to training process parameter values that contradict the physical laws underlying the processes examined. For training process parameter values, physical value ranges can be defined based on the design of the plant and the physical and chemical processes occurring in the plant, i.e. value ranges that are in accordance with the underlying physical laws. Training process parameter values that lie outside these expected value ranges will be treated, for example, as non-physical. In the case of such non-physical values, it must be assumed that these are based, for example, on errors in the acquisition of the training process parameter values. The plant design can define, for example, value ranges for parameter values or training process parameter values for which the plant is designed and which can be achieved in the plant. If training process parameter values are outside these expected value ranges for which the system is designed, the corresponding training process parameter values can be rejected as non-physical.

For example, an assessment as to whether a training process parameter value is non-physical, is made locally, i.e. taking into account the local design of the plant as well as the physical and chemical processes that occur locally in the plant. For example, an assessment is made as to whether a training process parameter value acquired by a sensor is non-physical, taking into account the training process parameter values acquired by adjacent sensors. For example, cross-sensor plausibility checks can be carried out, and implausible values can be identified as non-physical and removed. For example, training process parameter values detected by adjacent sensors should not differ from each other, or only to a limited extent, if no process steps, i.e. physical and/or chemical processes, occur between or in the region of the corresponding sensors which can lead to a significant change in the corresponding training process parameter values. In this case, a significant change means, for example, a change that lies outside a predefined range of variation, as might be caused, for example, by tolerances in the design of the production plant and/or tolerances in the measurement accuracy of the sensors used for the measurement. In addition, certain trends can be assumed for the training process parameter values. For example, in the absence of exothermic reactions, i.e. if there are no exothermic or purely endothermic reactions, a temperature should decrease without the supply of energy to the system due to the generally occurring heat dissipation. If successive temperature sensors provide increasing training process parameter values for the temperature although a temperature decrease would be expected for these sensors, a plausibility test can lead to a rejection of the increasing training process parameter values as non-physical values.

According to embodiments, the method further comprises aggregating the training process parameter values acquired for one or more sensors by the respective sensor, wherein the corresponding training process parameter values are assigned to an aggregation time window using the respectively assigned acquisition times, with associated process parameter values associated to a common aggregation time window each being aggregated.

Embodiments may have the advantage that the training data in aggregated form is more convenient to handle and evaluate.

According to embodiments, the sensor-specific time shifts of the sensors, the training process parameter values of which are aggregated, are determined for each of the aggregation windows and assigned to the aggregated training process parameter values of the respective aggregation window. Embodiments may have the advantage that intervals between the data acquisition operations of the sensors are set, for example, such that during the production of the same product unit, a plurality of training process parameter values are acquired by the same sensor and thus efficiently processed.

According to embodiments, the provision of input data further comprises extracting statistical feature values and/or frequency feature values from the training process parameter values for training the machine learning module. Embodiments may have the advantage that by using statistical feature values such as mean, median, minimum, maximum, variance, etc. and/or frequency feature values such as a dominant frequency, low- or high-frequency content, a spectral difference, etc., the amount of data to be processed by the machine learning module can be reduced and the learning can therefore be carried out more efficiently and be less error-prone.

According to embodiments, the provision of input data further comprises scaling the extracted feature values for training the machine learning module. Embodiments can have the advantage that suitable scaled, for example normalized, data can be processed more efficiently by the machine learning module. According to embodiments, the provision of output data comprises scaling the training product quality parameter values.

According to embodiments, the provision of input data further comprises reducing the dimensionality of extracted feature values using a transformation of the extracted feature values. For example, a principal component analysis can be used as a transformation technique. Embodiments can have the advantage that the amount of data to be processed by the machine learning module can be reduced and thus the training can be carried out more efficiently.

According to embodiments, the method further comprises assigning weighting factors of the machine learning module, which are used for weighting extracted features based on training process parameters which have been acquired for identical process parameters of sensors arranged within the same subsystem of the production plant, to a common weighting group, wherein weighting factors of the same weighting group are equated and trained together. Embodiments can have the advantage that fewer weighting factors need to be learned individually and the training can thus be made more efficient.

According to embodiments, one or more application-specific loss functions for use by the machine-learning module are provided, in order to weight specific prediction errors selectively more strongly than other prediction errors in the course of the training. Embodiments may have the advantage that prediction errors can be weighted individually. If the predictions of the prediction model are to be used for quality control of manufactured products, it may be important that the predicted quality is not overrated for selected or all product quality parameters. This ensures that, using the appropriate predictions, product units with inadequate quality can be rejected with high reliability and the risk of inadequate product units being inadvertently allowed through due to tolerances of the predictions can be minimized. For example, a prediction error that predicts product purity to be too high will be rated more negatively than a prediction error that predicts a product purity to be too low.

According to embodiments, in addition to the training data, test data is provided as a second statistically independent random sample, which includes test process parameter values and test product quality parameter values, wherein the test data is used for testing the prediction accuracy of the prediction model with the machine-learning module trained with the training data, wherein the testing comprises predicting product quality parameter values using the test process parameter values and comparing the resulting predicted product quality parameter values with the expected test product quality parameter values, wherein in the case of strongly varying operating conditions of the production plant under which the training data and test data are created, the training data and test data are compiled in such a way that the different operating conditions are represented in equal proportions in the training data and test data.

Embodiments may have the advantage that an effective and reliable testing of the prediction accuracy of the prediction model is made possible.

According to embodiments, the machine learning module comprises an artificial neural network, for example, a multilayer perceptron (MLP), a convolutional neural network (CNN), a recurrent neural network (RNN) or a long-short-term memory network (LSTM network). Embodiments may have the advantage that an effective prediction of product quality parameter values is made possible.

For example, the chemical production plant is a large-scale chemical production plant. A large-scale chemical production plant can be a production plant designed to produce chemical products on a large scale, in particular an industrial scale. Such a plant, i.e. a chemical production plant and/or large-scale chemical production plant, can be constructed from a plurality of subsystems (e.g. 5-10 or more). A subsystem is characterized in particular by an independently functional assembly, the function of which preferably has a direct influence on the production or the production flow.

According to embodiments, the production plant is a physico-chemical production plant, for example, a polymer production plant for producing a polymer product. The polymer may be, for example, polyethylene terephthalate (PET), polyamide (PA), polylactide (PLA), polyethylene (PE), polypropylene (PP), polyvinyl chloride (PVC), low-density polyethylene (LDPE), or ethylene vinyl acetate copolymers (EVA).

According to embodiments, the chemical product plant is a large-scale chemical production plant. According to embodiments, the production plant comprises a plurality of subsystems, for example, 2, 3, 4, 5, 6, 7, 8, 9, 10 or more. According to embodiments, a subsystem comprises an independently functional assembly, the function of which preferably has a direct influence on the production or the production flow of the production plant.

For example, the chemical production plant may be a polymer production plant for producing a polymer, a cement production plant for producing cement, or an aromatic extraction plant for producing or supplying aromatics using an extraction method.

According to embodiments, the product quality parameter values of the product units are product quality parameter values which are determined by taking random samples from the corresponding product units, for example, using a product quality analysis method carried out in a laboratory.

Embodiments further comprise a method for predicting product quality parameter values for one or more quality parameters of a chemical product produced by a chemical production plant using a computer-implemented prediction model having a machine learning module wherein the production plant comprises a plurality of sensors, which are each configured to acquire process parameter values for one or more process parameters of a chemical process for producing the chemical product carried out by the 15 production plant in the operation of the production plant, the method including:

- providing a plurality of process parameter values acquired by the sensors in the operation of the production plant, wherein the process parameter values are each assigned an acquisition time and an identifier of the acquiring sensor,
- providing a priori information about the production plant and the process carried out by the production plant, wherein the a priori information includes chronological sequence information about a chronological sequence of the process carried out within the production plant,
- for each of the sensors, determining a sensor-specific time shift between the acquisition times of the process parameter values acquired by the corresponding sensor and a production time of the product unit, for which product quality parameter values are to be predicted and during the production of which the respective process parameter values were acquired, the determination being carried out in each case using the chronological sequence information, with the determined sensor-specific time shifts of the sensors being assigned in each case to the process parameter values acquired by the respective sensor,
- assigning to each other the process parameter values that were acquired during the production of the same product unit, wherein the process parameter values to be aggregated are determined using the sensor-specific time shift,
- using each of the assigned process parameter values to provide input data of the trained machine learning module to predict one or more product quality parameter values,
- receiving one or more product quality parameter values predicted using the trained machine learning module for the product unit, during the production of which the product quality parameter values used to provide the input data were acquired, as an output of the prediction model.

Embodiments may have the advantage that a method for data-based online product quality prediction for industrial chemical production plants is provided. Thus, there is no need to wait for an analysis, such as a laboratory analysis, of product quality. Instead, a precise indication of the quality of the corresponding manufactured product can be given directly upon completion of manufacture. This enables effective quality monitoring, in which, for example, product units with insufficient quality can be rejected. For example, a quality is inadequate when one or more of the predicted product quality parameters are outside a predefined acceptable tolerance range. In particular, a predictive quality monitoring enables a quality monitoring that takes into account the quality of each individual product unit and not just that of individual statistical samples analyzed in the laboratory.

Embodiments use easily acquired process data to predict product quality. Embodiments can have the advantage of providing a data analysis tool that enables a detailed analysis of historical data and is able to analyze correspondingly large amounts of data efficiently in order to gain relevant insights. Despite the nonlinear complexity and multivariate nature of corresponding production processes, embodiments are able to accurately predict product quality in contrast to conventional simulation models.

Embodiments may have the advantage that no or at most sporadic offline laboratory measurements are required for determining the quality characteristics of the products produced by the plant, such as polymer products. Such laboratory measurements are usually labor-intensive and cost intensive. Results are generally only available after a significant time delay of, for example, several hours or up to one day.

Embodiments may have the advantage that properties of the end product can be determined completely by using process parameters during the operation of the production plant, i.e. during the production process.

According to embodiments, the production plant collects process data, i.e. process parameter values, for a plurality of process parameters at each production step in the production operation, i.e. normal operation.

Embodiments may have the advantage that, in contrast to known simulation and modeling methods, they are able to accurately derive product quality properties from real-time process data despite a nonlinear complexity and multivariance, such as occur in polymer production processes. In particular, embodiments may have the advantage, in contrast to known models for quality prediction, of being able to take full account of dynamic fluctuations and external influences, such as constantly occur in real industrial processes.

In the course of providing the input data to the acquired process parameter values, embodiments can apply all data processing methods of the training process parameter values previously described for the training.

According to embodiments, the method comprises an additional training of the trained machine learning module, the additional training comprising:

providing product quality parameter values, which were determined using one or more of the product units produced by the production plant for which product quality parameter values have been predicted, as additional training product quality parameter values, assigning the provided process parameter values that were acquired during production of the respective product units, for which the additional training product quality parameter values are provided, as additional training process parameter values to the additional training product quality parameter values, wherein the process parameter values that were acquired during the production of the respective product units are determined using the acquisition time of the respective process parameter values, the sensor-specific time shifts of the sensors acquiring the respective process parameter values, and the production times of the respective product units produced, additionally training the machine learning module using the additional training product quality parameter values and the assigned additional training process parameter values, wherein the respective additional training product quality parameter values are used to provide additional output data and the respectively assigned additional training process parameter values are used to provide additional input data of the machine learning module for the additional training.

Embodiments may have the advantage that by repeatedly training the machine learning module, the prediction accuracy and the prediction scope of the prediction model can be gradually improved.

According to embodiments, the prediction model is configured to take into account changed operating conditions. The prediction model acquires process data for continuous learning, enabling it to automatically adapt to changing conditions. If the acquired process data includes previously unseen, changed process data resulting from the changed operating conditions, these are applied in the course of a subsequent, continuous training of the prediction model and used as training data. This means, for example, that an additional training, i.e. retraining, of the prediction model is possible. The consideration of current and possibly previously unseen, changed process and/or product quality data allows the generalization level of the predictive capability of the prediction model to be extended, thus enabling it to dynamically adapt to diverse future changes in production conditions.

According to embodiments, the method further comprises detecting anomalies in the predicted product quality parameter values, the detection of the anomalies comprising:

comparing the product quality parameter values determined using the product units produced by the production plant with the product quality parameter values predicted for the respective product unit, if a deviation between the predicted and determined product quality parameter values for the same product unit meets a predefined criterion, identifying the predicted product quality parameter values as anomalies, if one or more of the predicted product quality parameter values are identified as an anomaly, outputting an anomaly alert.

Embodiments may have the advantage that anomalies can be detected effectively. Corresponding anomalies may be caused by the production plant or by the prediction model. Embodiments may have the advantage that they are able to recognize anomalous and faulty plant operating processes, such as reactor contamination, decomposition processes, failures of specific components, etc., and identify probable root causes for the detected anomalies. For this purpose, for example, deviations between model predictions and retrospectively measured product quality data are evaluated. If the deviations, for example individually or in combination, exceed a predefined threshold value, this indicates the presence of an anomaly or fault in the operation of the plant. Likewise, for example, deficiencies in the prediction model can be identified.

According to embodiments, the predefined criterion comprises exceeding a predefined first threshold value. According to embodiments, satisfying the predefined criterion comprises a confidence level of the deviation falling below a predefined second threshold value.

According to embodiments, a precondition for initiating an additional training of the trained machine learning module comprises identifying one or more of the predicted product quality parameter values as an anomaly. Embodiments may have the advantage that the machine learning module can be improved if the anomaly is caused by deficiencies in the previous training of the machine learning module.

According to embodiments, a precondition for initiating an additional training of the trained machine learning module comprises accumulating additional training product quality parameter values and additional training process parameter values for a predefined number of product units produced. Embodiments can have the advantage that the machine learning module can be continuously improved.

According to embodiments, the method further comprises:

selecting from the process parameters, for which the sensors of the production plant acquire process parameter values, a group of controllable process parameters which can be controlled by a central control system of the production plant, identifying a subgroup of the controllable process parameters, the variation of which most strongly affects the product quality parameter values predicted using the trained machine learning module, wherein the identification comprises varying different subgroups of the controllable process parameters and comparing the resulting predicted product quality parameter values.

Embodiments may have the advantage that from a plurality of process parameters, the process parameters that are critical to the product quality can be identified.

According to embodiments, the method further comprises:

receiving a set of target product quality parameter values for one or more product quality parameters of the product to be produced by the production plant, determining process parameter values for the controllable process parameters of the subgroup for which a total deviation between the product quality parameter values predicted using the trained machine learning module and the received target product quality parameters falls below a predefined third threshold value, wherein the determination comprises a variation of the controllable process parameters of the subgroup using a non-linear minimization procedure, outputting the determined process parameter values as a recommendation for adjusting the controllable process parameters using the control system for producing product units of the product to be produced which exhibit the target product quality parameter values.

Embodiments can have the advantage that recommendations for improved or optimized control of the production plant can be provided. In other words, a method can be provided for interactive process optimization in production plants, such as industrial or large-scale chemical production plants.

Embodiments may also have the advantage that they are able to provide sophisticated data-driven recommendations for setting process parameters to improve, in particular optimize, the plant operation. Improvement, in particular optimization, of the plant operation means, for example, improvement, in particular optimization, of the resulting product quality. An improvement, in particular optimization, may also affect other parameters, such as process parameters for example, in the form of an increase, in particular maximization, of a throughput, an increase, in particular maximization, of an overall economic efficiency of the plant and/or a reduction, in particular minimization, of the energy consumption of the entire plant or individual plant sections.

According to embodiments, an interactive user interface is provided to the user on a display of a user interface. The interactive user interface provides the user with an input and/or selection option for entering and/or selecting desired target values, for example desired product quality values. Using the appropriate input and/or selection values, the interactive user interface outputs recommendations to the user for setting process parameters that can be used to achieve the desired product quality values.

Embodiments may have the advantage that suboptimal operating conditions of the production plant, such as those that have previously frequently occurred in polymer plants, can be avoided. For example, it is possible for embodiments to determine the settings for process control parameters which ensure a stable and optimal quality of a particular product, even in the light of a plurality of adjustable process control parameters, each of which strongly interact and have a strong influence on the product quality properties.

Determining the best settings for process control parameters is a major challenge, even for experienced plant operators, when there are a large number of adjustable process control parameters with strong interactions, which make it difficult to determine the best settings for the process control parameters. Up to now, so-called recipes, for example, have been used, which specify recommended values for selecting the most important process control parameters in order to achieve a certain quality and/or quality grade for specific products. However, this information is usually based only on very general and vague estimates of the values of the process control parameters in order to meet specified limits for the quality and/or quality grade of the products. In addition, such recipes can only be transferred from one plant to another to a limited extent.

Furthermore, actual effects of changes in process control parameters typically only occur after a process-specific, individual time delay. This time delay can last several hours to one day or more, depending on the process and the process control parameter that has been changed. Optimization of the process, performance, and quality parameters can be greatly hampered by this time delay.

Embodiments can thus provide a method for controlling and optimizing the product quality, in addition to online monitoring of various product properties.

Embodiments also comprise a method for training a machine learning module of a computer-implemented prediction model for predicting product quality parameter values for one or more quality parameters of a chemical product produced by a chemical production plant, wherein the production plant comprises a plurality of sensors which are each configured to acquire, during the operation of the production plant, process parameter values for one or more process parameters of a chemical process carried out by the production plant for producing the chemical product, wherein the computer system comprises a processor and a memory, wherein the prediction model with the machine-learning module is stored in the memory, wherein program instructions are also stored in the memory, wherein execution of the program instructions by the processor causes the processor to carry out a method comprising:

providing training data, wherein the training data for a plurality of product units produced by the production plant comprises product quality parameter values determined for each of one or more quality parameters of the respective product unit as training product quality parameter values, wherein the training product quality parameter values are each assigned a production time of the product unit for which they were determined, wherein the training data further comprises a plurality of process parameter values from each of the sensors as training process parameter values, which were acquired during the production of the product units for which the training product quality parameter values were determined, wherein the training process parameter values are each assigned an acquisition time and an identifier of the acquiring sensor, providing a priori information about the production plant and the process carried out by the production plant, wherein the a priori information includes chronological sequence information about a chronological sequence of the process carried out within the production plant, for each of the sensors, determining a sensor-specific time shift between an acquisition time of one of the training process parameter values acquired by the corresponding sensor and a production time of the product unit, during the production of which the corresponding training process parameter value was acquired, the determination being carried out in each case using the chronological sequence information, with the determined sensor-specific time shifts of the sensors being assigned in each case to the training process parameter values acquired by the respective sensor, assigning the training process parameter values to the one or more training product quality parameter values of one of the product units, during the production process of which the respective training process parameter value was acquired, using the acquisition time of the respective training process parameter value, the sensor-specific time shift of the sensor acquiring the respective training process parameter value, and the production time of the respective product unit, training the machine learning module using the training process parameter values and training product quality parameter values assigned to each other, wherein the respective training product quality parameter values are used to provide output data and the respective assigned training process parameter values are used to provide input data of the machine learning module for the training.

According to embodiments, the computer system is configured to carry out each of the embodiments of the method for training the machine learning module described above.

Embodiments further comprise a computer system for predicting product quality parameter values for one or more quality parameters of a chemical product produced by a chemical production plant using a computer-implemented prediction model having a machine learning module wherein the production plant comprises a plurality of sensors, which are each configured to acquire process parameter values for one or 5 more process parameters of a chemical process for producing the chemical product carried out by the production plant in the operation of the production plant, wherein the computer system comprises a processor and a memory, wherein the prediction model with the machine-learning module is stored in the memory, wherein program instructions are also stored in the memory, wherein execution of the program instructions by the processor causes the processor to carry out a method comprising:

providing a plurality of process parameter values acquired by the sensors in the operation of the production plant, wherein the process parameter values are each assigned an acquisition time and an identifier of the acquiring sensor, providing a priori information about the production plant and the process carried out by the production plant, wherein the a priori information includes chronological sequence information about a chronological sequence of the process carried out within the production plant, for each of the sensors, determining a sensor-specific time shift between the acquisition times of the process parameter values acquired by the corresponding sensor and a production time of the product unit, for which product quality parameter values are to be predicted and during the production of which the respective process parameter values were acquired, the determination being carried out in each case using the chronological sequence information, with the determined sensor-specific time shifts of the sensors being assigned in each case to the process parameter values acquired by the respective sensor, assigning to each other the process parameter values that were acquired during the production of the same product unit, wherein the process parameter values to be aggregated are determined using the sensor-specific time shift, using each of the assigned process parameter values to provide input data of the trained machine learning module to predict one or more product quality parameter values, receiving one or more product quality parameter values predicted using the trained machine learning module for the product unit, during the production of which the product quality parameter values used to provide the input data were acquired, as an output of the prediction model.

According to embodiments, the computer system is configured to carry out each of the embodiments of the method described above for predicting product parameter values using the trained machine learning module. Furthermore, the computer system can be configured to execute any of the embodiments of the method described above for detecting anomalies and/or for providing recommendations for setting controllable process parameters.

Elements of the following embodiments which correspond to each other are labeled with the same reference sign.

The following notation is used within the present description:

C denotes a vector of process parameter values that can be directly influenced by a user, i.e. the operator, of a production plant. $C_Q$ denotes a vector of process parameter values that can be directly influenced by the operator of the production plant and can affect product quality themselves. The following relation applies: $C_Q \subseteq C$. P denotes a vector of process parameter values that cannot be directly influenced by the operator of the production plant. X identifies a vector of all process parameter values, i.e., $X=C\cap P=C_Q\cap(C\backslash C_Q)\cap P$.

Q denotes a vector of predicted product quality parameter values that the prediction model predicts. Q' denotes a vector of measured product quality parameter values. For example, the corresponding measurements could be retrospectively performed laboratory measurements on product samples. Q* denotes a vector of desired product quality parameter values that cannot be specified directly by the operator of the production plant. $C_Q$* denotes a vector of recommended process parameters that a process improvement model recommends in order to achieve the desired product quality values Q*.

FIG. 1 illustrates a structure of an exemplary prediction model 120 and a data preparation carried out by the prediction model in the course of its use.

The prediction model 120 takes process data X 100, i.e. process parameter values with X={C, P}, as input. This process data 100 may thus include process parameter values C which can be directly influenced or set by an operator of a production plant and/or process parameter values P, which can be directly influenced or set by an operator of a production plant.

The process data X 100 is recorded, for example continuously or periodically, during the operation of a production plant. The process data X 100 includes, for example, sensor values, concentration values of basic constituents and additives, and flow rate values of basic constituents and additives, temperatures, pressures, valve positions, aggregated and/or calculated data values from the plant control system, etc.

The prediction model 120 uses the process parameter values X 100 as input values and predicts resulting product quality parameter values Q 130, for example material properties such as viscosity, purity, turbidity, color scale, etc., as output values. The prediction model 120 can be described as a function $f_M$ that outputs a vector or set of product quality parameter values X for a vector or set of process parameter values Q:

$$f_M(X)=Q$$

The prediction model 120, for example, is structured in a sequence of data processing steps of blocks 121-125, which are executed sequentially to prepare the input data, i.e. the process data X 100, followed by an artificial neural network algorithm in block 126 and a data post-processing in block 127 of the output data of the neural network 126. The results of the data post-processing 127 are, for example, predicted product quality data, i.e. product quality parameter values Q.

In block 121 a cleaning step is performed that includes, for example, validation of raw process data, removal of non-physical outliers, and/or calculation of missing process data.

Some processes, such as polymerization, are comparatively slow. In this case, the effect of changes in process parameter values on the quality of the final product or the product quality parameter values only appears after a time delay. To take account of this time delay effect, the cleaned data is aggregated and shifted to an appropriate frequency by using aggregation techniques such as data rolling or resampling (up- or down-sampling). In block 123, one or more characteristic feature values such as mean, median, minimum, maximum, variance, etc. are extracted from the aggregated groups for each group. The extracted feature data is normalized in block 124 by means of transformation methods, such as shifting by means, dividing by the standard deviation, or transformation of the MinMax range to the interval [0, 1]. For example, in block 125, a principal components analysis (PCA) can be optionally carried out to reduce the dimensionality of the normalized feature data, which involves combining values of significant features and removing values of insignificant features. In block 126, a model based on an artificial neural network is provided, which has been specifically trained to approximate a specific complex nonlinear production process, such as a polymer production process, and which calculates raw output data, i.e. raw product quality parameter values, from the pre-processed process data. In block 127, the raw output data of the artificial neural network is transformed and normalized to obtain predictions for product quality parameter values.

The exact algorithms and model parameters used in the data processing, post-processing and in the artificial neural network described above are determined over the course of a training procedure.

Figure 2:
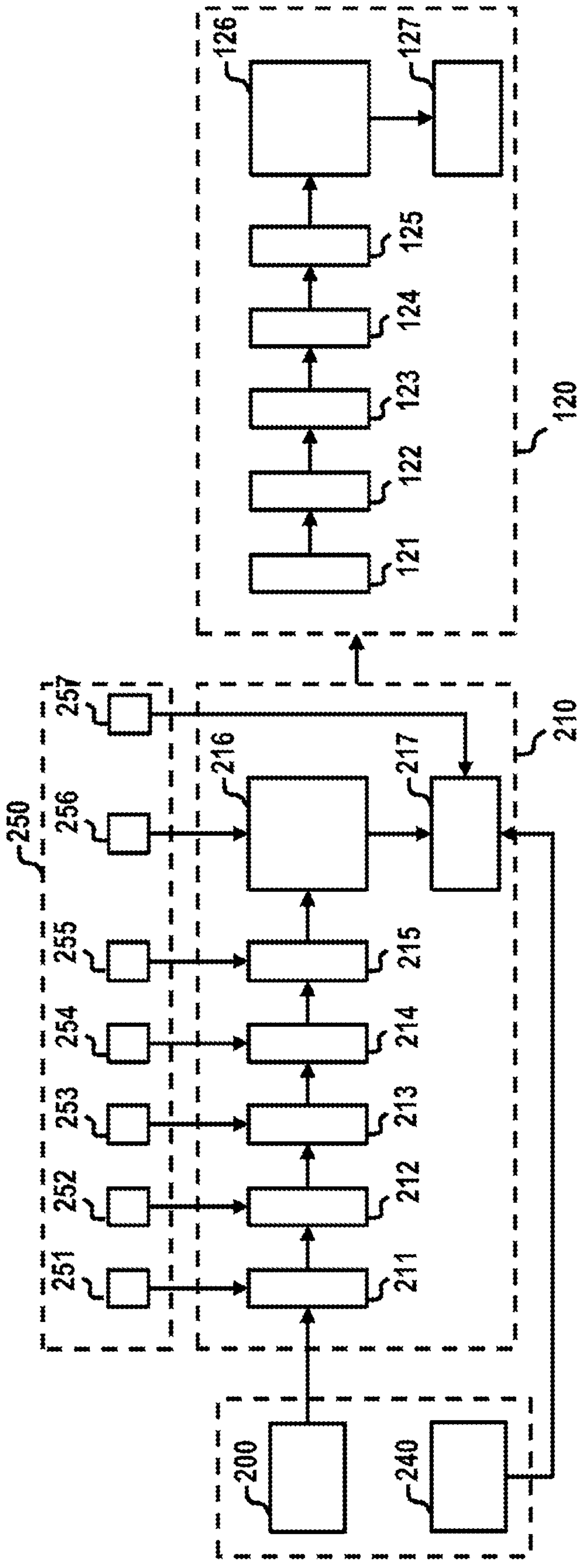
FIG. 2 shows a schematic flow diagram of a training procedure for training a prediction model using a priori additional information according to the disclosure.

FIG. 2 illustrates an exemplary training procedure for training a prediction model using a priori additional information. The prediction model comprises an artificial neural network. The a priori additional information includes, for example, engineering and/or process knowledge.

In the course of the training procedure, the untrained prediction model 210 learns suitable model parameter values using historical training datasets $$\{X_T, Q'_T\}245.$$

These training datasets each comprise real historical, i.e. previously measured, process data values $X_T$ 200 as well as real historical product quality data values $$Q'_T 240,$$

which result from the historical process data values $X_T$ 200 of the corresponding training dataset $$\{X_T, Q'_T\}245.$$

The process data values $X_T$ 200 were measured, for example, during an operating phase of a test and/or controlled mode of the production plant, while the historical product quality data values $$Q'_T \ 240$$

were determined, for example, by means of offline laboratory measurements of the resulting end products. According to embodiments, the training data of the training datasets $$\{X_T, Q'_T\} \ 245$$

can be recorded, for example, during a normal operating phase of the production system or during a commissioning phase of the production system. In particular, they can be recorded live and made directly available to the prediction model for training purposes.

The untrained prediction model 210 shown in FIG. 2 comprises a sequence of modules 211-217. The modules 211 to 215 are, for example, data preparation modules, module 216 is an artificial neural network module, and module 217 is a data post-processing module. The data preparation modules include, for example, a data cleaning module 211, a data aggregation module 212, a data transformation module 213, a data normalization module 214, and/or a principal components analysis module 215. The module 216 is, for example, a neural network module which provides an artificial neural network to be trained, for example, a multilayer perceptron (MLP), a convolutional neural network (CNN), a recurrent neural network (RNN), a long short-term memory network (LSTM network), etc. Finally, the prediction model to be trained comprises a data normalization module 217.

For example, hyperparameters are defined for the training procedure, i.e. algorithm-specific values that control the learning process of the prediction model in the course of the training procedure, such as learning rate, tolerance, etc. In addition, model parameter values are learned from the training data, i.e. values that determine how the artificial neural network algorithm calculates an output. The model parameters are, for example, weights and coefficients of the artificial neural network.

In an ideal scenario, the training datasets should be as extensive as possible, i.e. they should cover a sufficiently long period of time during which the production plant was operated under all possible operating conditions and a wide range of product qualities were produced. In such an ideal scenario, a prediction model can be efficiently trained, by learning a set of model parameters to optimally determine the relationships between input, i.e. between process data, and output, i.e. product quality, from the training data. The performance of the prediction model could then be optimized by testing and varying the exact algorithms and hyperparameters used in the model blocks 211-217.

In practice however, i.e. in real scenarios, it is not possible to collect such extensive training datasets that a simple, direct learning process would be possible on the basis of the extensive training datasets alone. As a result, previous prediction models, trained on the basis of training datasets alone, are either too inaccurate or too specialized to actually be useful in real-world applications. In addition, there are countless options for choosing algorithms and hyperparameters in each of the model blocks 211 to 217, making it extremely difficult to find an optimal set of algorithms and hyperparameters.

Embodiments provide a method for integrating a priori additional information 250 about physico-chemical processes as well as the plant design of the production plant, which are the basis of the production process, into the training procedure. By using a priori additional information, the size of the value space for possible model algorithms and hyperparameters can be significantly reduced and the resulting trained prediction model combines the advantages of the process-driven technical design approach and the data-driven machine learning approach.

According to embodiments, the additional information may be based, for example, on technical documentation in the form of process flow diagrams, piping and instrumentation diagrams, triggering and alarm plans, hazard and operability studies, etc., as well as on qualitative knowledge of experienced engineers or plant operators. This additional information can be assigned to different domains 251 to 257 and is incorporated during model construction and model training to determine suitable algorithms and hyperparameters in each of blocks 211 to 217 of the training procedure.

Corresponding additional information can provide a priori knowledge or background knowledge based on the process-driven technical design approach that underlies the plant design of the production plant. This additional information includes, for example, information about the plant design of the production plant as well as the physicochemical processes occurring in the production plant. This a priori knowledge or background knowledge allows the data-driven machine learning approach to be supplemented by knowledge about the process-driven technical design of the production plant. This additional knowledge enables the machine learning to be made more efficient and precise.

Process flow diagrams, pipework and instrumentation diagrams, triggering and alarm plans, hazard and operability studies, etc. can be used to obtain information about the construction and mode of operation of the production plant and about where the physical chemical processes take place, which ones and in what form within the plant. For example, this can be used to create chronological sequence information about a chronological sequence of the process carried out within the production plant. For example, the above-mentioned documents may be used to derive processing and/or reaction speeds, heating and/or cooling speeds, as well as pipe lengths, pipe cross-sections and/or flow rates or throughput rates that affect the temporal processes within the production plant are taken. This information may also be used as a priori knowledge or background knowledge, for example, to constrain or concretize the data-driven machine learning. Based on the aforementioned information, for example, the sensors used to acquire process parameter values can be assigned to specific positions and/or physical and chemical processes in the production plant. Thus, the process parameter values acquired by the corresponding sensors can also be assigned to specific physical and chemical processes or sub-processes. This a priori knowledge or background knowledge about the process parameter values can be used to classify the process parameter values, which form the basis of the data-driven machine learning approach, into a procedural, constructive context. This context can be used, for example, for data cleaning and/or for defining dependencies and/or for defining temporal sequences of the data or process parameter values used by the machine learning module for machine learning. Likewise, appropriate qualitative knowledge, for example, of experienced engineers or plant operators, can supply information about the construction and mode of operation of the production plant and about where the physical chemical processes take place, which ones and in what form within the plant.

For example, for the data cleaning block 211, a priori additional information 251 from the knowledge domain for data cleaning is provided. For example, sensor and device specifications are provided. These specifications specify, for example, the type, sensitivity, and unit, etc. of the corresponding sensors or devices.

For example, the data cleaning block 211 can remove outlier values, which are not consistent with the specifications, from the input data, i.e. the process data values $X_T$ 200 of the training datasets $$\{X_T, Q_T'\}\ 245,$$

using the sensor and device specifications. The deleted outlier values are, for example, process data values that are located outside and/or inside a peripheral range of a predefined measurement or operating range for which sensors or devices are designed.

In addition, non-physical values can be identified based on the plant design and removed from process data values $X_T$ 200. The plant design can define value ranges for parameter values for which the plant is designed, and which can be achieved in the plant. If values outside these value ranges occur for which the plant is designed, the corresponding values can be rejected as non-physical. Furthermore, cross-sensor plausibility checks can be carried out, implausible values can be identified and removed from the process data values $X_T$ 200. For example, sensor values of adjacent sensors should not differ from each other, or only to a limited extent, if no process steps, i.e. physical and/or chemical processes, occur between or in the region of the corresponding sensors, which can lead to a significant change in the corresponding sensor values. In this case, a significant change means a change that lies outside a predefined range of variation, as might be caused, for example, by tolerances in the design of the production plant and/or tolerances in the measurement accuracy of the sensors used for the measurement. In addition, certain trends can be assumed for the measured sensor values. Thus, in the absence of exothermic reactions, i.e. if there are no exothermic or purely endothermic reactions, a temperature should decrease without the supply of energy to the system due to the generally occurring heat dissipation. If successive temperature sensors measure a temperature increase, although a temperature decrease is expected for these sensors, a plausibility test can lead to a rejection of a sensor value which indicates a temperature increase contrary to expectations.

According to embodiments, the a priori additional information 251 defines a set of process parameters that influence the product quality parameter values of the resulting end product. For example, for one or more process steps, process parameters are defined on which the final product quality parameter values depend. A completeness check is carried out for the process parameter set defined by the a priori additional information 251. If one of the training datasets $$\{X_T, Q_T'\}\ 245$$

contains process data values $X_T$ for one of the defined process parameters, process data values for this process parameter are added to the input data. The supplemented process parameters are derived, for example, from existing process data values, for example by means of interpolation and/or extrapolation. For example, process data values from other training data sets $$\{X_T, Q_T'\}\ 245$$

can also be used to derive missing process data values. For example, average values from other training datasets $$\{X_T, Q_T'\}\ 245$$

can be used and/or extrapolations from the other training datasets $$\{X_T, Q_T'\}\ 245$$

to the condition of the current training dataset. As additional training datasets for estimating and/or extrapolating missing process data values, it is also possible to use, for example, measured values from other production plants, measured values from test plants and/or test rigs, values from numerical computer simulations or values from analytical approximation formulas for describing the relevant process step.

Missing data values or those that are removed due to being identified as erroneous can be supplemented, for example, by means of design specifications or suitable statistical methods. Suitable statistical methods may include, for example: using a last or nearest valid value of the corresponding sensor, a mean value over a past time window, such as the last hour and/or hours, or an interpolation and/or extrapolation from data values of adjacent sensors.

For example, for the data aggregation block 212, a priori additional information 252 from the knowledge domain for data aggregation is provided.

According to embodiments, definitions of relevant timescales of the process are provided and used as the basis for aggregation of the process data values. The relevant timescales define time slots within which measured data is aggregated. The corresponding time slots define a frequency for aggregating the data.

According to embodiments, process data values of time-delayed processes, which were measured at different times, are assigned to the same process run and grouped together. Time delays in a time-delayed process are based, for example, on a sequence of consecutive process steps, a process operating mode such as batch or continuous mode, a dynamic behavior of the process, or a reaction kinetics of the process. For example, in order to define time delays in the process, process flow diagrams are provided which produce relationships between different plant sections that contribute to the same process run with a time lag.

For the feature extraction block 213, for example, a priori additional information 253 from the knowledge domain for feature extraction is provided. For example, feature values are calculated for aggregated numerical data as part of the feature extraction process. For example, aggregated categorical data is encoded during feature extraction. Calculated feature values can be features of the time domain, such as statistical values such as mean, median, minimum, maximum, variance, etc., or features from the frequency domain, such as a dominant frequency, low- or high-frequency content, a spectral difference, etc. These feature values are calculated from the aggregated values of one or more process parameters. For example, existing knowledge about the process behavior is encoded into numerical features. Additional features are extracted, for example, from existing parametric models, process simulations, or process-specific formulas.

For the data normalization block 214, for example, a priori additional information 254 from the knowledge domain is provided for data normalization. The feature values provided by the preceding feature extraction are scaled to improve the training of the subsequent neural network. For example, the feature values for the neural network would then be able to be handled more efficiently. According to embodiments, for example, an individual scaling method is selected for the feature parameters based on the sensor type, the underlying physical process and/or knowledge about the distribution of the process parameter values.

For the data transformation block 215, for example, a priori additional information 255 from the knowledge domain for data transformation is provided for the purpose of dimensionality reduction. The transformation in block 215 serves to reduce the dimensionality of the feature values to simplify the learning task for the neural network. For example, transformation techniques of principal component analysis (PCA), such as linear PCA, kernel PCA, etc., or linear discriminant analysis (LDA), are used to reduce the dimensionality of the input data of the neural network.

The transformation can be used to identify features that contain little predictive information, and to combine or eliminate the associated feature values. Likewise, features that contain a lot of predictive information, such as the basis of the process specification, can be emphasized.

For the artificial neural network 216, for example, a priori additional information 256 from the knowledge domain for neural networks is provided. According to embodiments, a suitable neural network type, such as MLP, CNN, RNN or LSTM network, is selected. For example, the architecture of the artificial neural network is also selected, i.e. the arrangement and number of layers and nodes used, activation functions, a loss function, and/or hyperparameters or a subspace of hyperparameters. For example, the selection is made using knowledge of the underlying production process, the input data, and/or the output data. For example, different types of artificial neural networks and/or networks with different configurations are tested.

For example, the training of the neural network is supported by providing definitions, with respect to which process parameters the neural network should be invariant. These definitions can be used to train the neural network with additional simulated data, which are stochastically perturbed with these target-preserving transformations.

For example, shared weights are used to train specific weights in the network together, based on knowledge of the location where a particular process step takes place. For example, features of specific sensor types in the same process unit are assigned the same weight. By training weights together, the efficiency of the training process can be increased.

For example, a weight reduction is used to normalize weights by incorporating process knowledge to smooth the data mapping. If, for example, $X_1 \approx X_2$ applies to all process parameters, except for possibly some individual ones, then $f_M(X_1) \approx f_M(X_2)$ should also apply.

For example, an application-specific loss function is constructed instead of an indifferent use of the typical mean squared error function (MSE) to specifically penalize particular erroneous predictions, e.g. contradictory or non-physical predictions. For example, with regard to impurity concentrations, mean-squared or absolute logarithmic deviations are used to penalize large or large negative deviations more heavily.

For example, warm start procedures are used to select initial model weights based on pre-trained models. For example, weights of a neural network that was trained with simplified training datasets of the same production plant or a similar production plant are used to initialize the weights. Weights of a neural network that was trained with training data of the same production plant before a reconfiguration can also be used.

For the data normalization block 217, for example, a priori additional information 257 from the knowledge domain is provided for output data normalization. Product quality parameters are scaled to match the scaling of the neural net output data. For example, for each of the product quality parameters, the choice of scaling method is based on an expected distribution of the corresponding product quality parameter values.

By including one or more of blocks 251 to 257, the training procedure for training the prediction model is carried out using the training datasets $$\{X_T, Q_T'\}\ 245,$$

for example, by means of cross-validation. The training datasets are mixed and divided into subgroups for training, validation, and testing. These subgroups are used for training and for benchmarking the performance of the model.

If the available training datasets are severely unbalanced with regard to the operating conditions for which they were measured, the partitioning into subgroups is controlled by using a variable corresponding to the operating state or operating conditions. An imbalance in operating conditions can be due, for example, to the fact that the production plant in which the corresponding training data values are measured is only operated under a few conditions and barely at all under other conditions. The corresponding variable can be, for example, a directly measured process parameter, a parameter derived from calculations, or a result of an additional step in a cluster analysis of the operating conditions. In this case a percentage composition of the subgroups with regard to training data records of the different operating conditions can be ensured. Similarly, if the training data records are severely imbalanced with regard to the target variables, the subgroups are divided, for example, by using one of the target variables or an additional metric of a cluster analysis of the product quality parameters. For example, an imbalance in the operating conditions may be due to the fact that the production plant mainly produces end products of very similar product quality.

The validation data records are used for further tuning of the neural network. Hyperparameter optimization approaches, such as a grid search or random search, take a subrange of hyperparameter ranges and return a tuple of hyperparameters that optimally map the input data onto the output data, i.e. the process parameter values to the product quality parameter values.

The result of the training procedure is a trained prediction model $f_M$ 120, i.e. a prediction model with precise algorithms and model parameters for each of the blocks 121-127 of the corresponding prediction model, so that for each new data record of process parameter values X as input data, a data record of product quality parameter values Q can be calculated as output data. This trained prediction model $f_M$ 120 can be used, for example, during the operation of the production plant to continuously predict and monitor expected quality properties in real time without having to wait for laboratory measurements.

Figure 3:
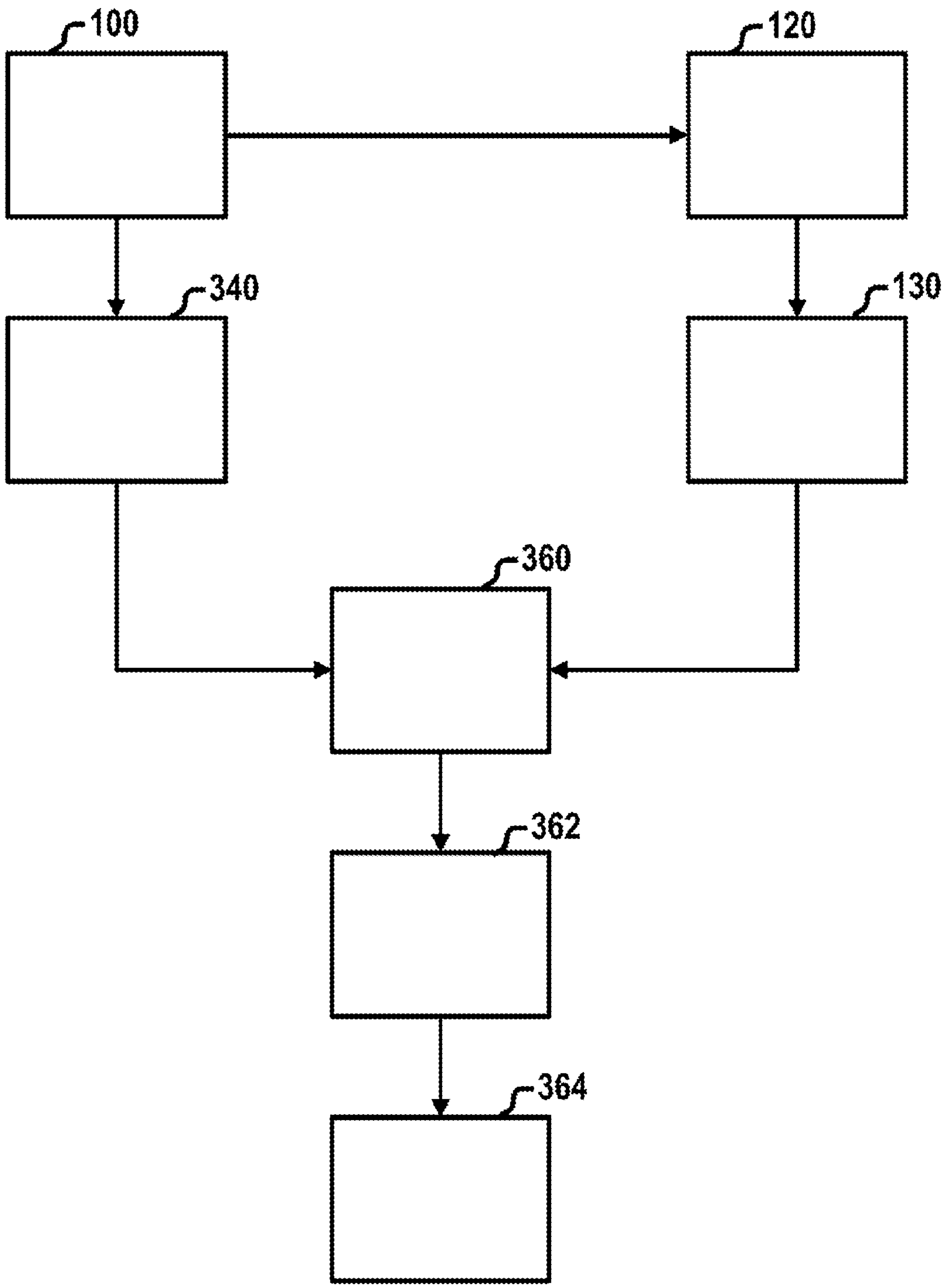
FIG. 3 shows a schematic flow diagram of a method for detecting and analyzing anomalies according to the disclosure.

FIG. 3 illustrates an exemplary method for detecting anomalies using the prediction model.

After successful training, the trained prediction model $f_M$ 120 can accurately represent the production process, for example, a polymer production process, and predict product quality parameter values Q 130 based on process parameter values X 100 of the production plant directly during operation, for example.

Product quality parameter values Q' 340 resulting from retrospective laboratory measurements can be used to gain further insights into the operation of the production plant. In particular, by using such measured product quality parameter values Q' 340, an anomaly detection method can be implemented, which is used to detect an anomalous and faulty operation of the production plant. Such an anomaly may include, for example, reactor contamination, decomposition processes occurring within the production equipment, failures of components of the production plant, etc. Even if such a prediction model $f_M$ 120 is used, which is able to deliver accurate predictions for product quality, it may still be necessary to carry out appropriate retrospective laboratory measurements of product quality, such as for product quality certification. Even if such laboratory measurements, when a precise prediction model $f_M$ 120 is available, need to be performed much less frequently than is currently the case in production plants.

At a given time t, measured product quality parameters Q'(t) 340 are compared with the product quality parameters Q(t) 330 predicted for that time t using a classification function $f_A$(Q', Q) 360. Depending on the size of a deviation between Q'(t) and Q(t), $f_A$ classifies each time point t either as normal if the prediction Q(t) matches the measurement Q'(t) sufficiently closely, or as an anomaly event 362 if a deviation between Q'(t) and Q(t) is too large.

The classification and interpretation of a match as "sufficiently close" and a deviation as "too large" can be achieved using various approaches:

One approach to a decision rule to determine whether a match between Q'(t) and Q(t) is sufficient or whether it is an anomaly, is to use a predefined threshold. Measured product quality parameters Q'(t) are classified as an anomaly event if a deviation between Q'(t) and Q(t) exceeds the predefined threshold. For example, the deviation can be quantified using the L1 or L2 loss function, which is the least absolute deviation $$(LAD)\ L_1 = \sum_{i=1}^{n} |Q_i'(t) - Q_i(t)|$$

or the least square error $$(LSE)\ L_2 = \sum_{i=1}^{n} (Q_i'(t) - Q_i(t))^2.$$

Another approach to classification is based, for example, on an assessment of the confidence, i.e. the statistical certainty of the prediction model. Measured product quality parameters Q'(t) are classified as an anomaly event if a deviation between Q'(t) and Q(t), quantified for example by the L1 or L2 loss function, lies outside a statistical certainty range or confidence interval of the corresponding prediction model. One way to quantify the statistical certainty of the prediction model is to use a second neural network that has been trained to predict the accuracy of the first prediction model.

If an event is classified as an anomaly event 362 at time t, for example, a root cause analysis can be performed that identifies the most likely cause of the anomaly, such as a unit of the production plant or a sensor.

Figure 4:
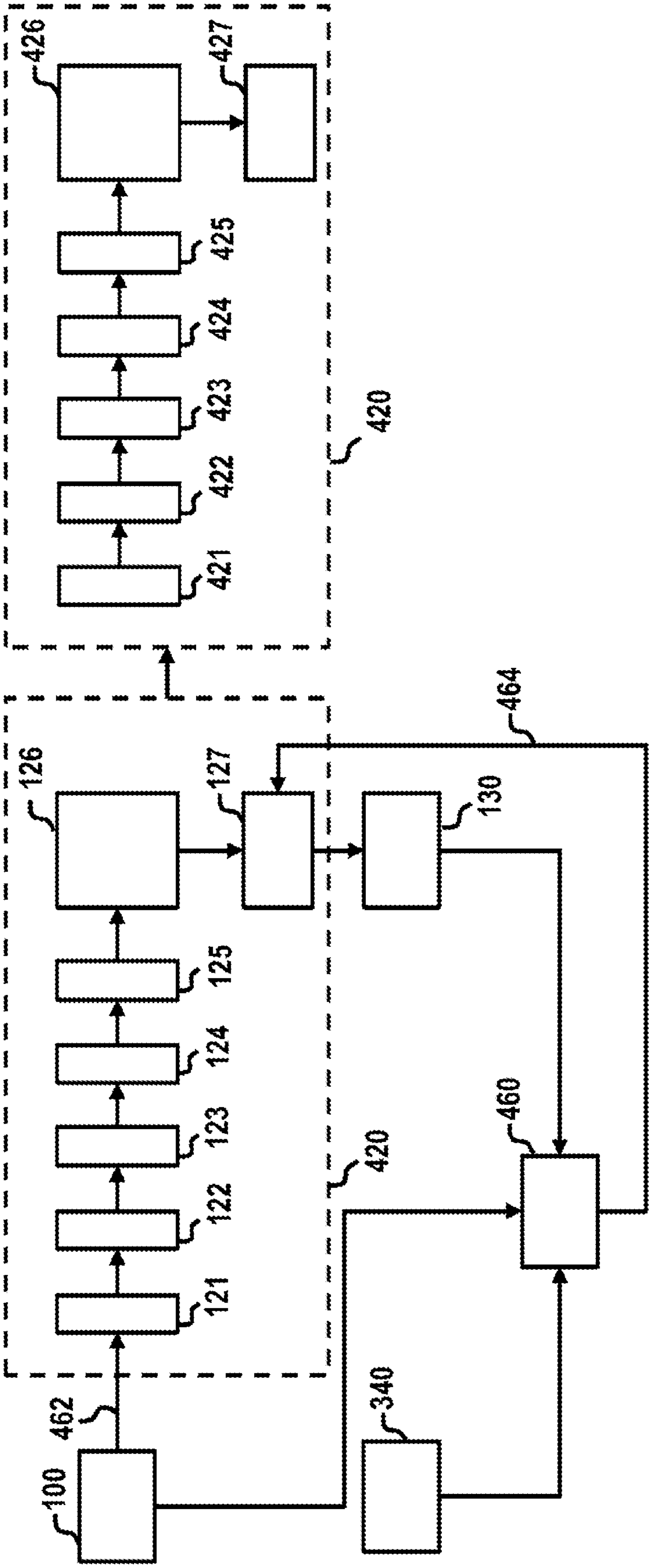
FIG. 4 shows a schematic flow diagram of a method for re-training the prediction model according to the disclosure.

FIG. 4 illustrates an exemplary training procedure for retraining the prediction model using current process and product quality data as training data.

By means of retraining, a continuous learning process can be implemented for an already trained prediction model $f_M$ 120. Even in a prediction model $f_M$ 120 which has been trained with a priori additional information as previously described, the performance of the prediction model when applied to novel real-world process parameter values depends on the training records used for the training and the process conditions under which these training records were obtained. While the prediction accuracy for operating conditions similar to training conditions is usually very good, the prediction accuracy of the prediction model will decrease significantly if the operating conditions under which the novel real-world process parameter values were acquired are significantly different from the operating conditions under which the process parameter values of the training records were acquired.

According to embodiments, such a limitation can be reduced by means of a method for continuous retraining of the prediction model with newly collected data as training data, if the operating conditions of the production plant change over time.

The process parameter values X 100 of the production plant are used continuously as input data for the already trained prediction model $f_M$ 120, which returns predicted product quality parameter values Q 130 in real time as output data. In addition, occasionally performed retrospective laboratory measurements provide measured product quality parameter values Q' 340.

At each time t a classification function $f_{\cup}$(X, Q', Q) 460 determines how the new observation is to be used for retraining the prediction model $f_M$ 120. Possible forms of retraining are, for example, an online or a mini-batch training procedure.

For example, the online training method uses every new observation to train the existing prediction model sequentially by means of back propagation. The newly trained model is dynamically adjusted, with a tendency to emphasize current observations more strongly than older data. Such an online training procedure may be used, for example, in one or more of the following cases:

For example, either the measured process parameter values X(t) or the measured product quality parameter values differ Q'(t) significantly from those of existing training data $$X_T \text{ and } Q'_T.$$

The measure of the "difference" can be, for example, a probability value of a clustering model or an index value of a local outlier factor model (LOF model). In this case, for example, the clustering model clustering or the LOF model was trained in advance using the corresponding existing training data $$X_T \text{ and } Q'_T.$$

For example, the existing prediction model $f_M$ 120 has a low confidence, i.e. low statistical certainty, for the new observation. One way to quantify the statistical security of the prediction model $f_M$ 120 is to use a second neural network that has been trained to predict the accuracy of the first prediction model $f_M$ 120.

For example, the existing prediction model $f_M$ 120 has a high statistical certainty, but the prediction accuracy of the prediction model $f_M$ 120 for the new observation is low, which means that there is a large deviation between measured product quality parameter values Q'(t) and product quality parameter values Q(t) predicted by the prediction model $f_M$ 120, which exceeds a predefined threshold value.

In contrast to the online training procedure, the mini-batch training method does not use every new observation directly to train the prediction model $f_M$ 120, but firstly collects a predefined minimum number of n new observations and trains the existing model only when this predefined minimum number, i.e. the batch size, is reached. A model newly trained in this way can have the advantage that it is able to approximate the entire training data better globally. For example, a mini-batch training procedure can be used in one or more of the following cases:

For example, the measured process parameter values X(t) of the production plant and the measured product quality parameter values Q'(t) are comparable to existing training data and data previously used for the training $$X_T \text{ and } Q'_T.$$

For example, the existing prediction model $f_M$ 120 for the new observations has a high statistical certainty and a high prediction accuracy.

The new data $$\{X_T(t), Q'_T(t)\}$$

or, in the case of a mini-batch training method, the collection or stack of new data is used as input data 462 and output data 464 for training the existing model $f_M$ 120. The result of the retraining is an updated prediction model $f_M$ 420, i.e. a prediction model with accurate algorithms and model parameters in each of the blocks 421-426. Thus, a prediction model can learn continuously from new observations and thus automatically adapt to future operating conditions of the production plant.

Figure 5A:
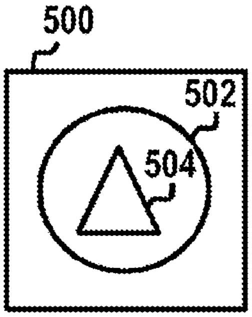
FIG. 5 shows schematic flow diagrams of an improvement procedure for improving process parameter settings according to the disclosure.
Figure 5B:
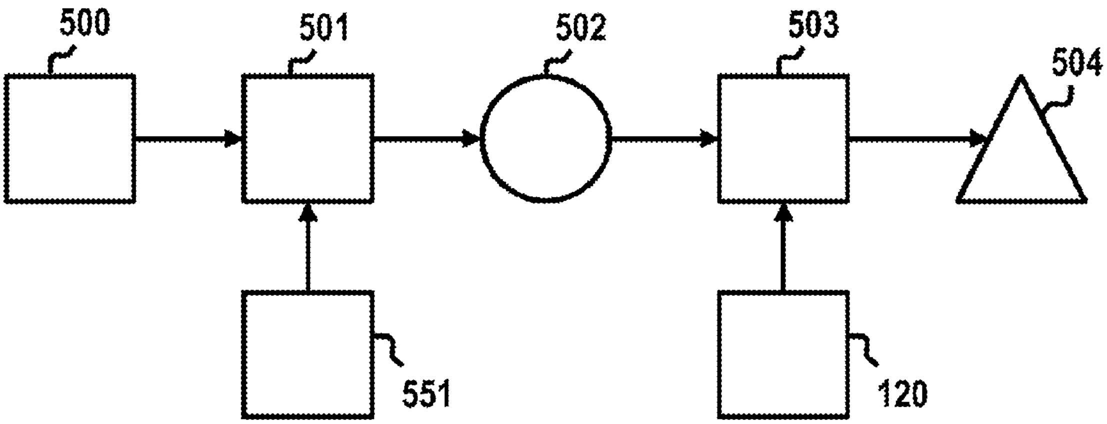
Figure 5C:
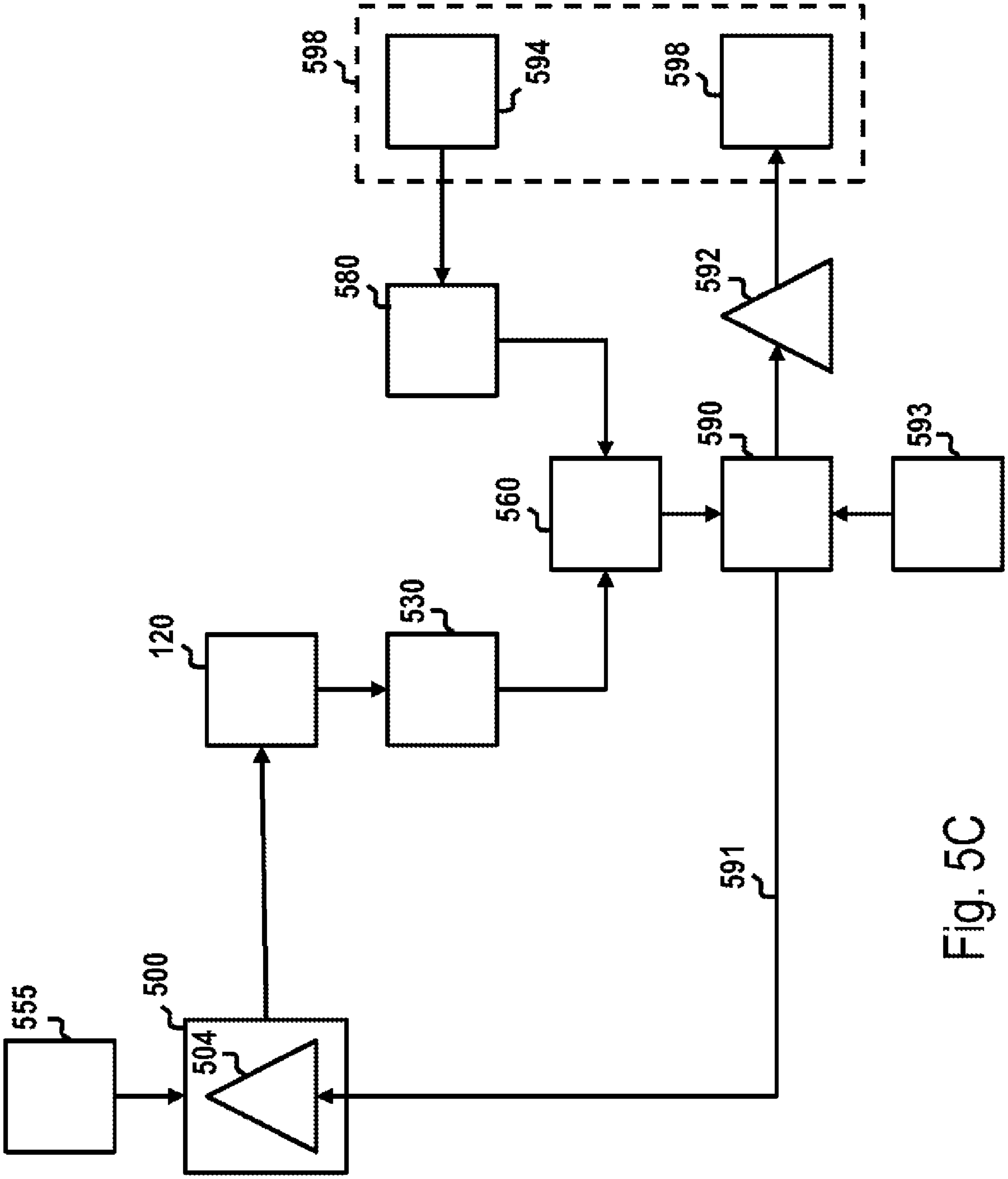

FIG. 5 illustrates an exemplary improvement method for improving process parameter settings to achieve desired product quality values.

According to execution models, a method for providing recommendations for setting process parameters to improve the operation of the production plant is created for the purpose of process optimization based on the quality prediction model $f_M$ 120. For example, this method provides the operator of the production plant with suggestions for improved setpoints for the process parameters so that target specifications such as product quality, product yield, energy efficiency, etc. can be improved, in particular maximized.

For example, the improvement method comprises providing a definition of which process parameter values are to be changed and improved by the production plant operator. In general, the entire set of available process parameters X 500 can be divided into the process parameters C 502, which can be controlled directly by the operator, and process parameters P, which cannot be controlled directly by the operator. The set of controllable process parameters C 502 can be divided into two groups: the control parameters $C_Q$504, which have a direct influence on the product quality, and the remaining control parameters $C \setminus C_Q$ which either do not affect the product quality or only via their correlation with parameters already defined in $C_Q$.

A combination of knowledge about the production plant on the one hand and machine learning on the other hand can be used to determine which process parameters from X 500 belong to the subsets 502 and 504. The subset C 502 of all controllable process parameters can be compiled from X 500 using a rule-based selection algorithm 501 including information 551 about the production plant in the form of technical documentation of the production plant, such as process flow diagrams, pipework and instrumentation diagrams, triggering and alarm plans, hazard and operability studies, etc. For example, expertise of technicians and plant operators can also be incorporated.

The subset $C_Q$ 504 of all controllable process parameters relevant to the product quality prediction is identified, for example, by means of a search method using a recursive feature elimination algorithm 503. The search process uses the trained prediction model $f_M$ 120 and compares different combinations of subsets of C 502 and evaluates their relevance for the model accuracy, i.e. the accuracy of the prediction from the prediction model 120. Embodiments may have the advantage that in $C_Q$ 504 only takes into account the controllable process parameters that contribute most to the model accuracy.

According to the definition of the subset $C_Q$ 504, it follows that all other process parameters $X \setminus C_Q$ have little or no influence on the quality prediction. For example, a statistical measure 555, such as a mean value or a distribution function, is used to model these process parameters in the subsequent steps of the improvement method. Using some initial values for $C_Q$ 504 the trained prediction model $f_M$ 120 can be used to predict the product quality parameter values Q 530 from input data $\tilde{X}=\{C_Q, \widetilde{X \setminus C_Q}\}$ 500.

The target specification, i.e. the desired quality of the final product, is described by a vector Q* 580. A scalar function $f_R$ 560, which represents a measure of the difference between the predicted quality and the target quality, can be defined in several ways. For example, $f_R$ can be specified as the sum of the squared distance of a currently predicted product quality vector Q with respect to the desired product quality vector Q* according to the target specification:

$$f_R(Q, Q^*) = \sum_i \frac{(Q_i - Q_i^*)^2}{w_i^2}$$

The effects of the individual quality parameters can be controlled by means of a weight vector w.

Using the prediction model $f_M(X)$ 120, the function $f_R$ can be described as:

$$f_R\left(f_M(\tilde{X}), Q^*\right) = f_R(f_M(\{C_Q, \widetilde{X \setminus C_Q}\}), Q^*) = \sum_i \frac{(f_M(\{C_Q, \widetilde{X \setminus C_Q}\})_i - Q_i^*)^2}{w_i^2}$$

In order to find an improved, for example, optimal set of parameter values $$C_Q^*$$

that have a smaller or smallest deviation from the target specification Q*, a nonlinear optimization algorithm $f_O$ 590 is used to minimize $f_R$, $$f_O: \min(f_R(f_M(\{C_Q, \widetilde{X \setminus C_Q}\}), Q^*)) \xrightarrow{yields} C_Q^*.$$

In this case, $C_Q$ 504 is iteratively modified (591) to find a set of parameter values $$C_Q^*$$

so that $$f_R(f_M(\{C_Q, \widetilde{X \setminus C_Q}\}), Q^*) \leq f_R(f_M(\{C_Q, \widetilde{X \setminus C_Q}\}), Q^*) \text{ for all } C_Q.$$

As the optimization algorithm $f_O$ 590, for example, a Nelder-Mead method or downhill simplex method, a simplex method, or a limited-memory Broyden-Fletcher-Goldfarb-Shanno (L-BFGS) method is used.

According to embodiments, the parameter space for $C_Q$ 504, in which the optimization algorithm $f_O$ searches for an optimized solution, is thus constrained such that only physically meaningful process parameter values that can be set in the production plant can be obtained by means of the optimization algorithm. These constraints and other hyperparameters of the optimization model are provided by definitions 593 based on information on general physical constraints, production facility constraints, and/or parameter ranges in historical data.

The resulting set of process parameter values $$C_Q^* \quad 592$$

represents a recommendation to achieve desired product quality parameter values Q* 580. The input and output of the optimization algorithm $f_O$ 590 can be integrated into a comprehensive interactive user interface 598. Via an input function 594 of this interactive user interface 598, a user can enter the desired product quality parameter values $$Q^* \quad 580$$

and after execution of the improvement procedure receives the calculated process parameter values $$C_Q^* \quad 592$$

as output via an output function 596 of the interactive user interface 598.

Figure 6A:
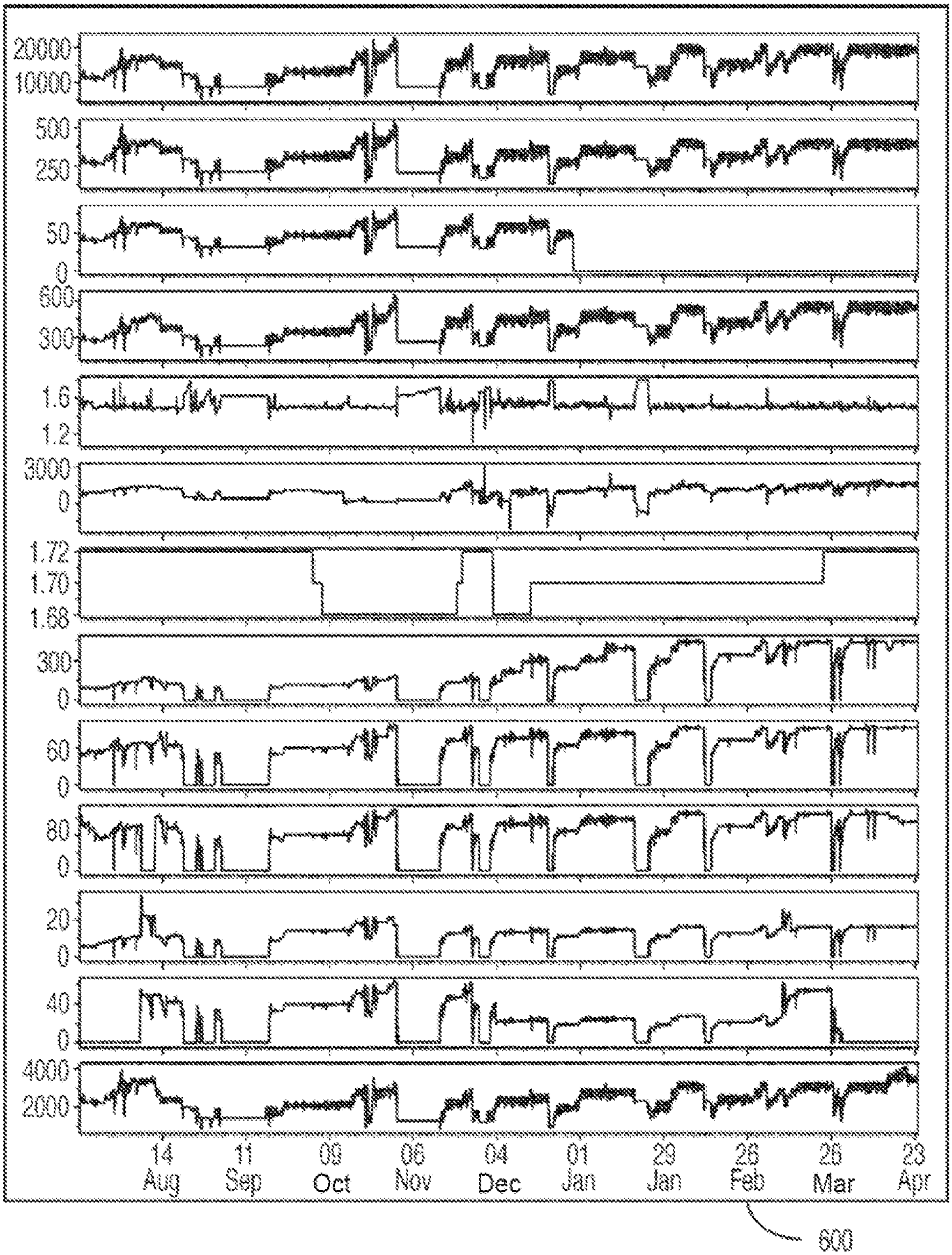
FIG. 6 shows time series data of process and product quality parameter values for a PET production plant according to the disclosure.
Figure 6B:
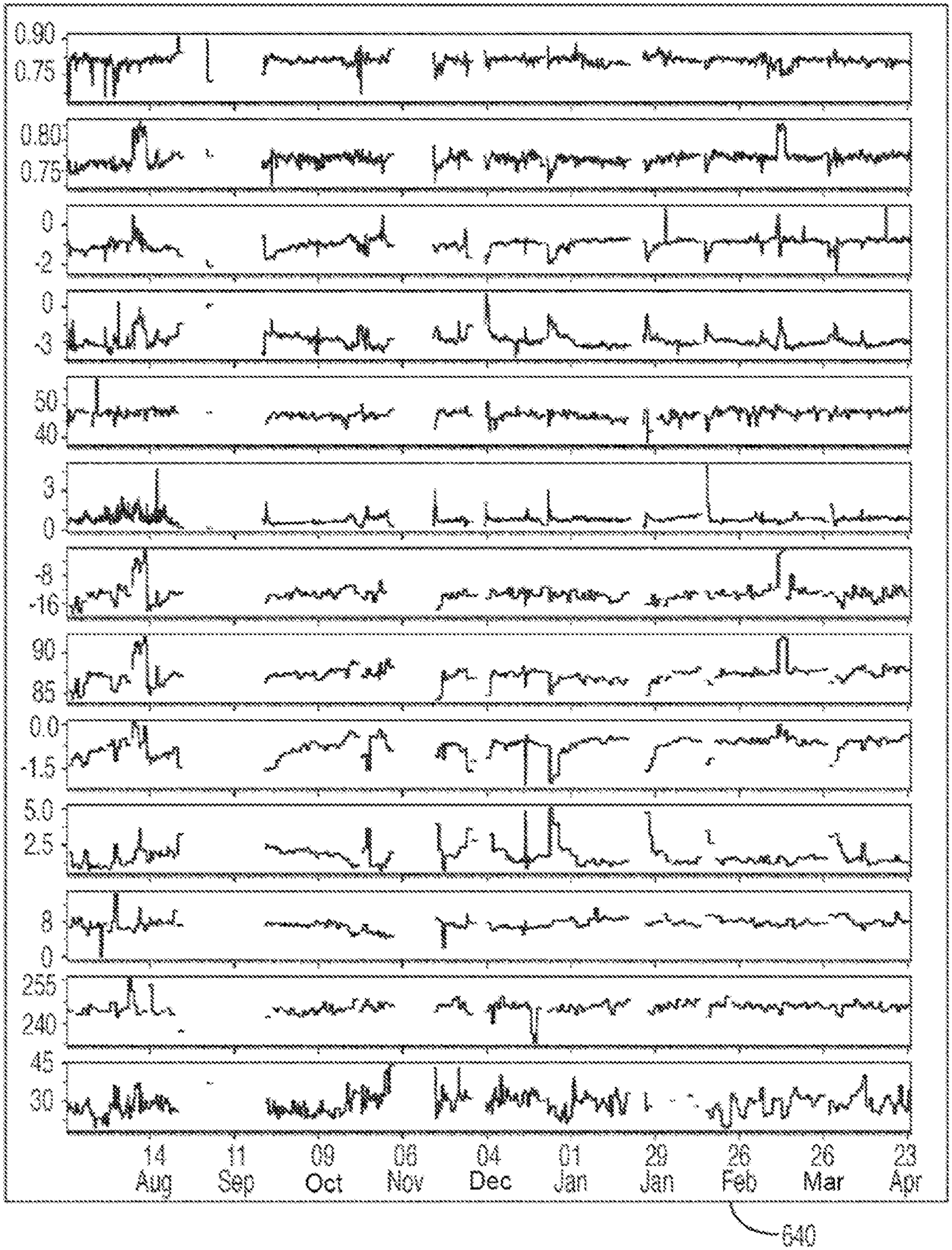

FIGS. 6A, B show exemplary time series data of process and product quality parameters for an exemplary polyethylene terephthalate (PET) production plant, for which the proposed approach can be used by way of example. FIG. 6A shows an extract of process parameter values 600 from an exemplary training dataset which is based on historical operating data of an exemplary PET plant. The training dataset comprises, for example, 495 process parameters, of which 13 process parameters are shown in FIG. 6A for reasons of clarity. FIG. 6B shows product quality parameters 640 from the same example training dataset. The training dataset comprises 13 product quality parameters, for each of which product quality parameter values are shown in FIG. 6B, which quantitatively describe the quality of the final product. For example, most of the process parameters were sampled at a frequency of 1 hour, while laboratory measurements of the product quality parameters were conducted every 4 to 24 hours. As part of a separation method for training a prediction model according to one of the embodiments described herein, the training dataset is cleaned using statistical characteristic values and process specifications. The process data parameter values are then shifted by a time delay of 4 to 24 hours, with individual delays applied for each process unit by using process flow information. The time-shifted process data parameter values are aggregated into groups of 2 hours. Feature values are extracted for each of these groups. Extracted feature values include mean, standard deviation, and in some cases the difference between groups. All feature values are normalized. For example, for normally distributed feature values z-normalization is used, i.e. expected value 0 and its variance/standard deviation 1, while for binary distributed features, for example, a MinMax normalization is used. The dimensionality of the 495*3 feature parameters is reduced to about 50 dimensions by a principal component analysis and by neglecting contributions of non-significant components. The data is divided into three statistically independent samples, i.e. a training dataset, a test dataset, and a validation dataset. The resulting training dataset comprises 70% of the data points, the test dataset comprises 25% and the validation dataset comprises the remaining 5% of the data points. For example, the artificial neural network is implemented as a multi-layer neural perceptron network, which consists of two hidden layers with a maximum of 200 nodes and a rectified activation function for the input and the hidden layers. In addition, regularization models, in particular lasso regression and ridge regression, are applied. The prediction model is trained iteratively using the Adam optimizer, by minimizing a mean square error of the output of the neural network relative to the truth values of the training dataset. For example, the iterative minimization is performed for a maximum number of 1000 epochs. However, an early stop criterion is enforced to ensure that the loss function of the simultaneously evaluated validation sample is a minimum and learning of statistical variations in the training sample is avoided.

Figure 7:
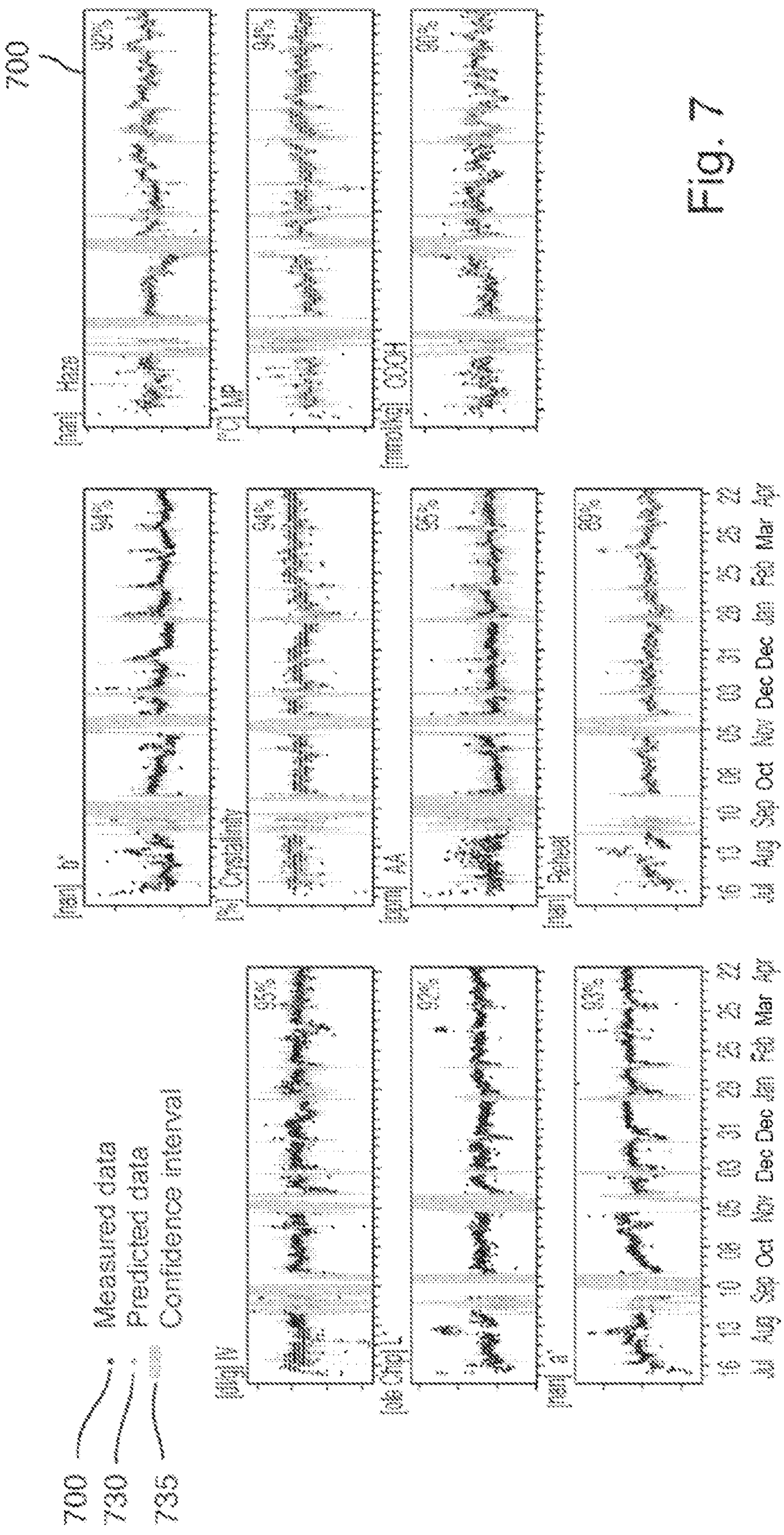
FIG. 7 shows diagrams of a comparison of predicted and retrospectively measured product quality parameter values according to the disclosure.

FIG. 7 shows a comparison of predicted and retrospectively measured product quality values. The high degree of agreement indicates the high level of accuracy of the predictions achieved by the prediction model.

The trained prediction model $f_M$ was evaluated on the independent test dataset, from which it was determined that the prediction model $f_M$ accurately describes the relationships between process parameter values and product quality parameters of the test dataset. FIG. 7 shows the measured product quality parameter values 700 of the test dataset, the product quality parameter values predicted by the trained prediction model $f_M$ 730 using the process parameter values of the test dataset, and the respective confidence intervals 735 for the predictions with the trained prediction model $f_M$.

For a method for providing recommendations for improvement using the trained prediction model $f_M$, a subset of, for example, 45 controllable process parameters $C_Q$ is determined using information about the process configuration and a feature elimination algorithm based on the prediction model $f_M$. To determine an optimized set of process parameter values to achieve desired product quality parameter values Q*, for example five quality parameters and the plant capacity, a numerical objective function $f_R$ is defined as the squared sum of the deviations of all predicted product quality parameter values Q from the desired product quality parameter values Q*, each weighted by an individual factor w. The objective function is minimized using the Nelder-Mead nonlinear minimization algorithm. To improve the convergence time of the minimization, the initial minimization parameters are determined from the historical dataset. As a recommendation, the mean values of each of the process parameter values are chosen which result in the best product quality parameter values in comparison to the desired product quality parameter values, i.e. come closest to the desired product quality parameter values. For example, the algorithm typically converges within a few thousand iterations.

Figure 8:
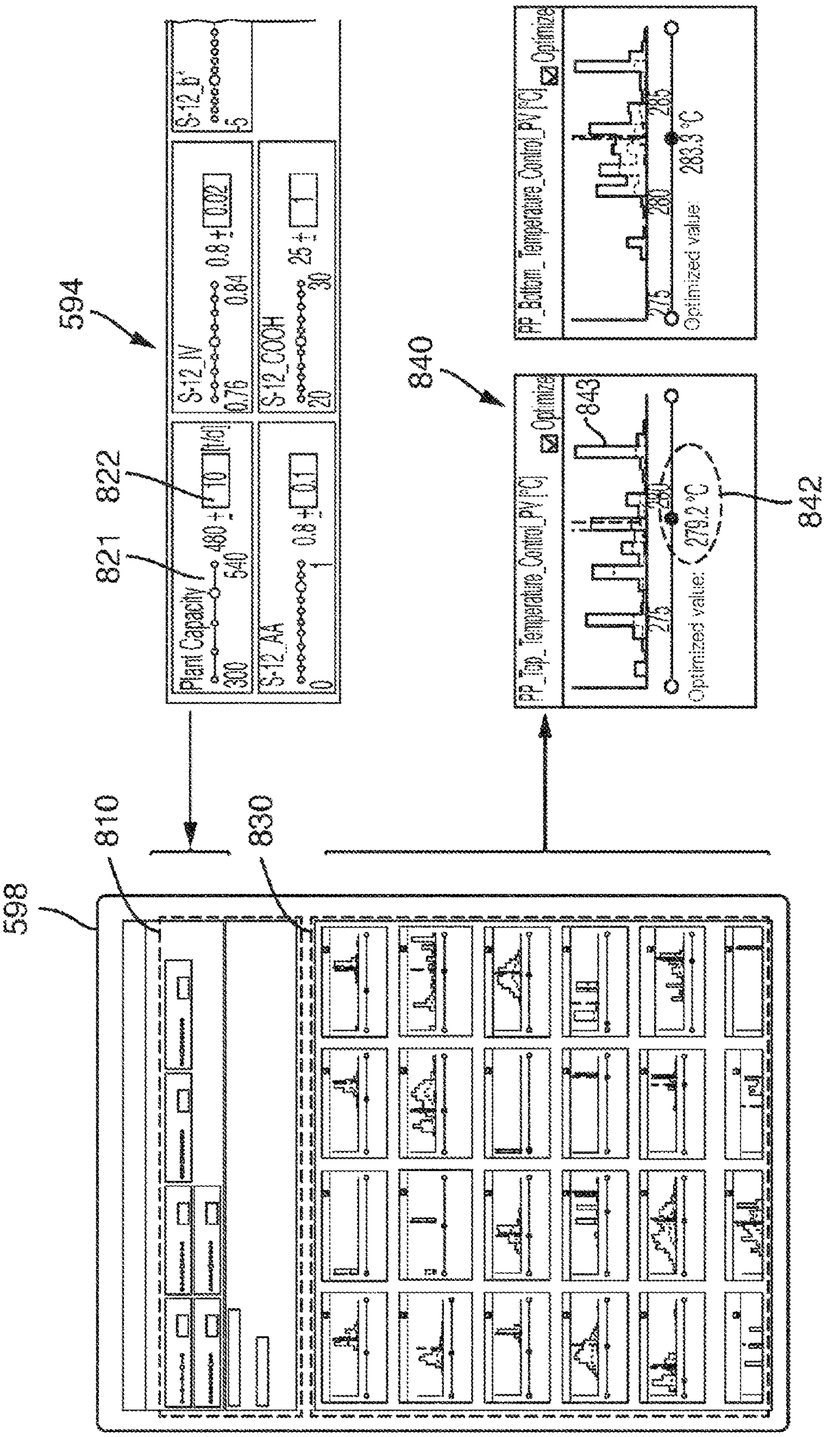
FIG. 8 shows a schematic diagram of a user interface for entering desired product quality parameter values and for providing recommendations for improved process parameter settings to achieve the desired product quality parameter values according to the disclosure.

FIG. 8 shows an exemplary user interface 598 for entering desired product quality parameter values Q* 594 and for providing recommendations for improved process parameter settings to achieve the desired product quality parameter values. The user interface 598 allows the plant operator to interact directly with the optimization model. For this purpose, the user interface 598 provides an input module 820, via which the operator can select a desired product quality Q* 594 by entering or selecting a product quality parameter value 821 and the tolerance range 822 for the product quality parameter value 821. Upon receipt of the specification of the product quality Q* 594, the method for providing improvement recommendations, as described in FIG. 7, for example, is carried out until an optimized set of controllable process parameters $$C_Q^*$$

is found. For example, this set of controllable process parameters $$C_Q^*$$

includes optimized settings for each of the process parameters, for example 45, which is displayed in segment 596 of the user interface. The output of the optimized settings includes for each of the controllable process parameters $$C_Q^*$$

an output module 840, which includes a recommended process parameter value 842. In addition to the recommended process parameter value 842, for illustrative purposes the output module 840 may optionally include a graphical comparison, for example, using histograms, of the recommended process parameter value 842 with the historically used process parameter values 843.

Figure 9:
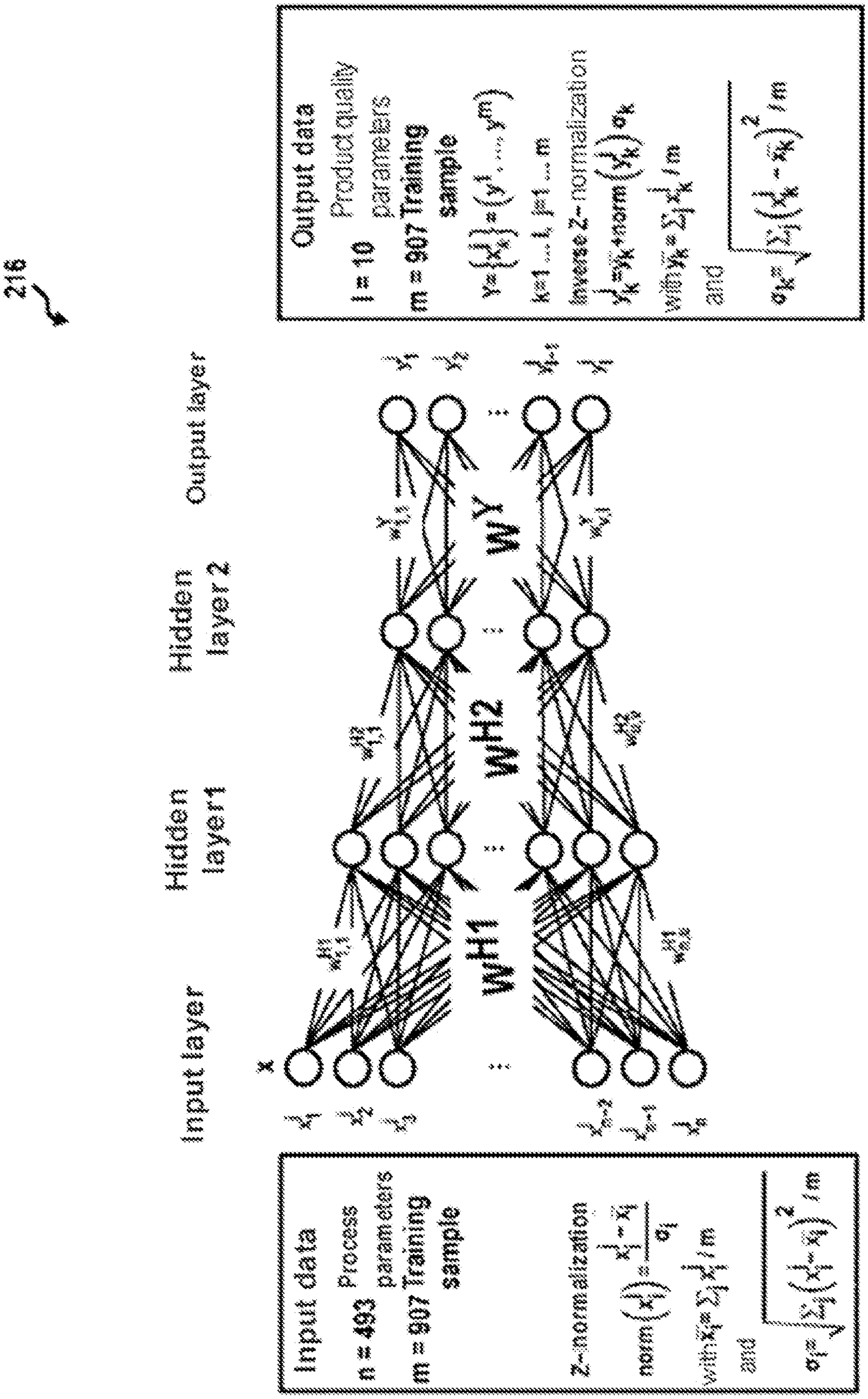
FIG. 9 shows a schematic diagram of a machine learning module in the form of an artificial neural network according to the disclosure.

FIG. 9 illustrates a schematic structure of an exemplary artificial neural network, which can be used as a machine learning module 216. The artificial neural network shown is the multi-layer neural perceptron network already described in the context of FIG. 6, with an input layer X, an output layer Y, and two hidden layers $H_1$ and $H_2$. A rectified activation function is used for both the input layer and the hidden layers. A large number of m training samples or training data records is provided, for example several hundred (e.g. m=907). Each of the training records comprises training process parameter values $$X=\{x_i^j\}=(x^1, \ldots, x^m)$$

for a large number of n process parameters, for example several hundred (e.g. n=493), with i=1, . . . , n and j=1, . . . , m. Furthermore, the training data records include product quality parameter values $$Y=\{x_k^j\}=(y^1, \ldots, y^m)$$

for a large number of I product quality parameters, for example I=10, with k=1, . . . , I and j=1, . . . , m. The training process parameter values $$X=\{x_i^j\}=(x^1, \ldots, x^m)$$

are used as input data for the input layer, for which they are scaled, for example, using a Z-normalization norm $$(x_i^j)=\frac{x_i^j-\overline{x}_i}{\sigma_i},$$

with $$\overline{x}_i=\sum_j x_i^j/m \text{ and } \sigma_i=\sqrt{\sum_j (x_i^j-\overline{x}_j)^2/m}.$$

The product quality parameter values are provided as output data to be predicted by the artificial neural network. Due to the Z-normalization of the input data, an inverse Z-normalization $$y_k^j=\overline{y}_k+norm(y_k^j)\sigma_k \text{ with } \overline{y}_k=\sum_j x_k^j/m \text{ and } \sigma_k=\sqrt{\sum_j (x_k^j-\overline{x}_k)^2/m}$$

must be applied to the values resulting from the artificial neural network, to ensure that the results are comparable to the product quality parameter values provided as output data. In the operation of the artificial neural network, weighting factors $W^{H1}$, $W^{H2}$, $W^{Y}$ of the connections between the nodes of the layers are adjusted so that when the input data X passes through the artificial neural network, these connections are processed from layer to layer, i.e. on the first hidden layer $$H_1=\sum_{i=1 \ldots n} w_{i,1 \ldots u}^{h1} x_i^j$$

and the second hidden layer $$H_2=\sum_{i=1 \ldots u} w_{i,1 \ldots v}^{h2} h_1^i,$$

such that they result in output data values $$Y=\sum_{i=1 \ldots v} w_{i,1 \ldots I}^{y} h_2^i$$

on the output layer, which after a reverse scaling, for example in the form of the inverse Z-normalization, correspond to the training product quality parameters.

Figure 10:
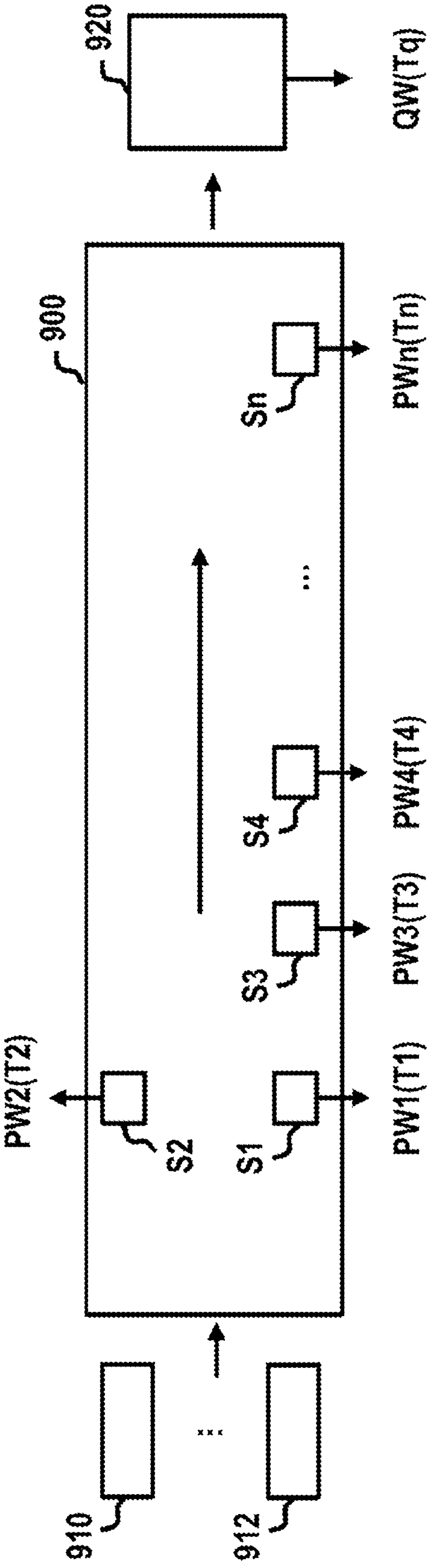
FIG. 10 shows a schematic diagram of a production plant according to the disclosure.

FIG. 10 schematically illustrates an exemplary chemical production plant 900, which produces a chemical product 920 from a plurality of chemical reactants 910, 912. The reactants 910, 912 can be fed to the process initially or at different times during the process. The product 920 can be produced directly from the reactants 910, 912, or else one or more intermediate products are produced from which the product 920 is produced as an end product. The product 920 can be analyzed to determine product quality parameter values QW. If the reactants 910, 912 undergo different process stages within the production plant 900, process parameter values of one or more process parameters PW1 to PWn are acquired by sensors S1 to Sn of the production plant 900. These process parameter values PW1 to PWn are acquired at identical and/or different times T1 to Tn. The product produced from the reactants 910, 912 is assigned a manufacturing time Tq, for example the time of manufacture of the product. Using information about the production plant and the process carried out by the production plant, for each of the sensors S1 to Sn a sensor-specific time delay can occur between a time T1 to Tn of acquisition of a process parameter value PW1 to PWn by the corresponding sensor S1 to Sn and completion of a unit of the product 920, during the production of which the corresponding process parameter values PW1 to PWn were acquired. Thus, by using the sensor-specific time delays the acquired process parameter values PW1 to PWn can be temporally assigned to the product units, the production process of which they describe or have influenced. These time delays can be independent of the acquired process parameter values PW1 to PWn or depend on one or more of these process parameter values. For example, if the process parameter values include a value for a flow rate of a material component for producing the product 920 through a pipe, the time delay between the acquisition times of upstream sensors relative to the production completion time Tq of the product 920 can depend on the time taken by the material component or a part of the material component necessary for the process to flow through the pipe. The process can be a batch process in which predefined batches of the reactants 910, 912 are provided, from which a batch of the product 920 is produced. In this case, for example, a product unit can be a batch of the product 920. Alternatively, it can be a continuous production process in which reactants 910, 912 are fed as continuous material streams and the produced product is obtained as a continuous material stream. In this case, for example, a product unit can be a random sample taken from the product material stream.

Figure 11:
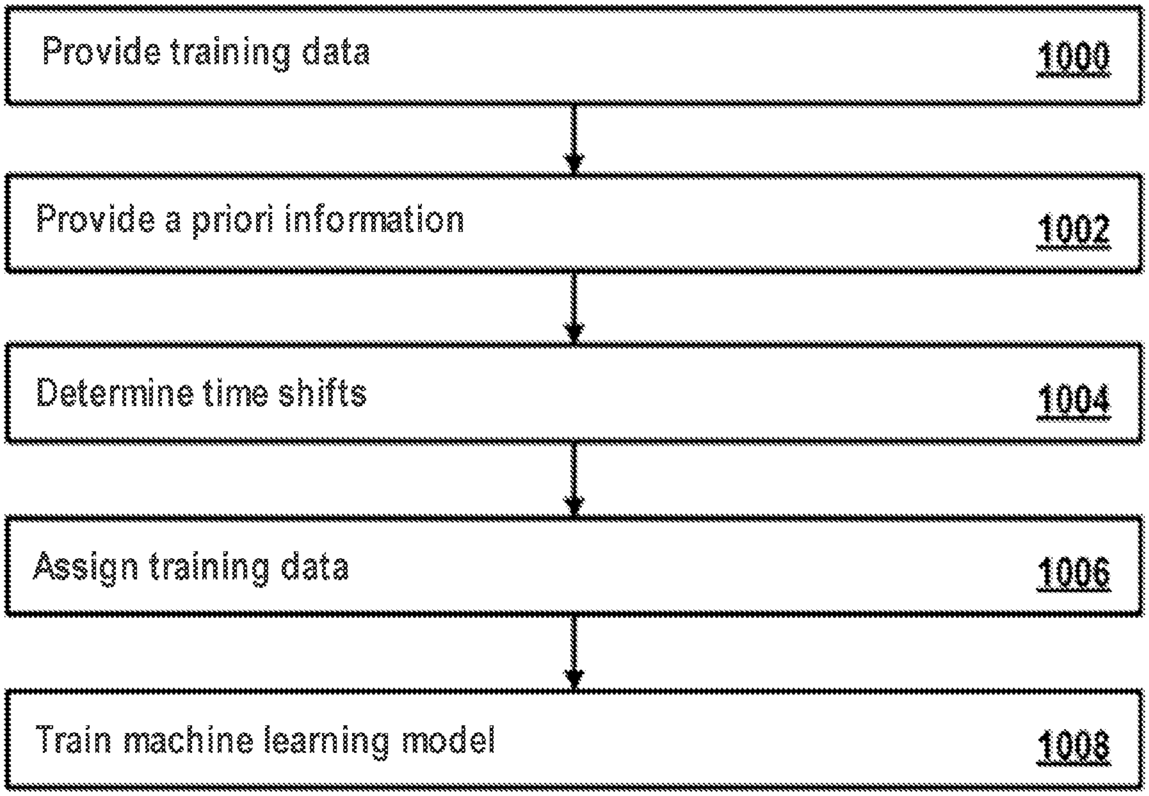
FIG. 11 shows a schematic flow diagram of a training procedure according to the disclosure.

FIG. 11 illustrates a method for training a machine-learning module, for example an artificial neural network, a computer-implemented prediction model for predicting product quality parameter values for one or more quality parameters of a chemical product produced by a chemical production plant, as shown, for example, schematically in FIG. 10. The production plant comprises a plurality of sensors t, each of which is configured to acquire process parameter values for one or more process parameters of a chemical process carried out by the production plant for producing the chemical product during operation of the production plant.

In block 1000 training data for training the machine learning module is provided. This training data comprises, for a plurality of product units produced by the production system, product quality parameter values determined for one or more quality parameters of the respective product unit as training product quality parameter values. These product quality parameter values are determined, for example, in the course of a quality analysis of manufactured product units, for example in a laboratory. These training product quality parameter values are each assigned, for example, a production time of the product unit for which they were determined. Furthermore, the training data from each of the sensors can comprise in each case a plurality of process parameter values as training process parameter values, which were acquired during the production of the product units for which the training product quality parameter values were determined. The training process parameter values are assigned, for example, an acquisition time and an identifier of the acquiring sensor.

In block 1002 a priori information about the production plant and the process carried out by the production plant is summarized. For example, this a priori information can comprise chronological sequence information about a chronological sequence of the process carried out within the production plant.

In block 1004, for each of the sensors, a sensor-specific time shift is determined between an acquisition time of one of the training process parameter values acquired by the corresponding sensor and a production time of the product unit during the production of which the corresponding training process parameter value was acquired. This time shift can either depend on or be independent of one or more of the selected process parameter values. The determination is carried out in each case using the temporal sequence information and the specific sensor-specific time shifts of the sensors are assigned to the training process parameter value acquired by the respective sensor.

In block 1006, the training process parameter values are assigned to the one or more training product quality parameter values of one of the product units, during the production process of which the respective training process parameter value was acquired. The assignment is carried out using the acquisition time of the respective training process parameter value, the sensor-specific time shift of the sensor acquiring the respective training process parameter value, and the production time of the respective product unit.

Finally, in block 1008, the machine learning module is trained using the training process parameter values and the training product quality parameter values assigned to them. The respective training product quality parameter values are used to provide output data and the respectively assigned training process parameter values are used to provide input data to the machine learning module for the training.

Figure 12:
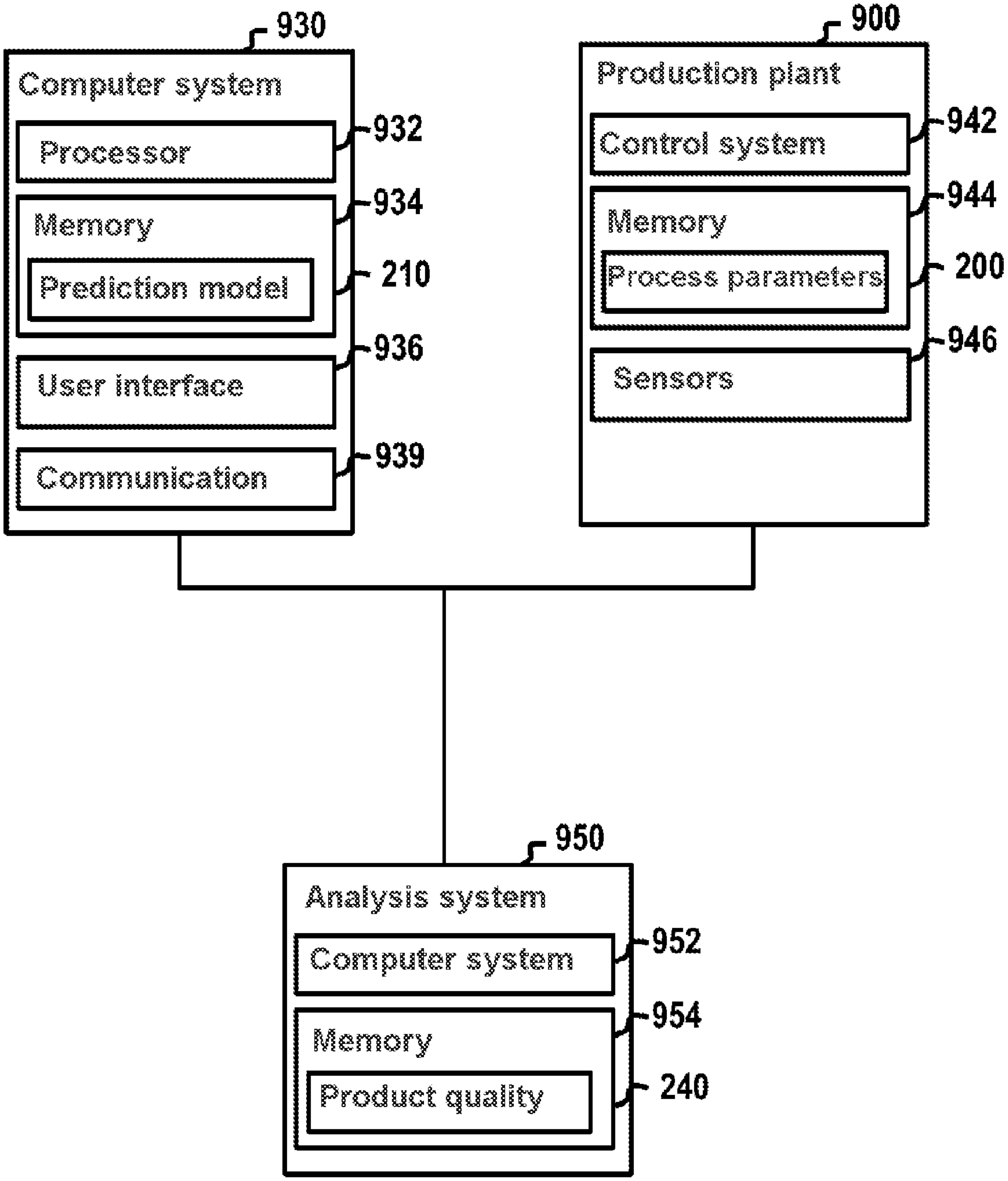
FIG. 12 shows a schematic diagram of infrastructure for training a prediction model according to the disclosure.

FIG. 12 shows an exemplary computer system 930 for training a machine-learning module of a computer-implemented prediction model 210 for predicting product quality parameter values. The computer system 930 comprises a processor 932 and a memory 934. For example, the prediction model 210 to be trained is stored in the memory 934. Further, program instructions are stored in the memory, the execution of which by the processor 932 causes the computer system 930 to execute a method for training the prediction model 210. The computer system 930 can further comprise a user interface 936, which provides input and output devices for a user to interact with the computer system 930. Further, the computer system 930 may comprise a communication interface 939, via which the computer system 930 can receive training data for training the prediction model 210. This training data comprises process parameter values 200 which were acquired from sensors 946 of a production plant 900 controlled by a control system 942, and product quality parameter values 240 of a product unit, determined by an analysis system 950, for example in a laboratory, for the production process of which the process parameter values 200 were acquired. The process parameter values 200 are stored, for example, in a storage device 944 of the production system 900 and provided to the computer system 930 via a communication link, e.g. via a network. Alternatively, the computer system 930 may also be a component of the production plant 900, such as its control system 942. According to another alternative embodiment, the process parameter values 200 are stored in an external storage device, such as in the cloud, from which the computer system 930 can download the process parameter values 200. The product quality parameter values 240 are stored, for example, in a storage device 954 of the analysis system 950 and provided to the computer system 930 via a communication link, e.g. via a network. Alternatively, the product quality parameter values 240 are stored in an external storage device, such as in the cloud, from which the computer system 930 can download the product quality parameter values 240.

After the prediction model 210 is trained, the computer system 930 can use the trained prediction model for predicting product quality parameter values of product units currently produced by the production plant 900. In addition, the trained prediction model can be used to detect anomalies and to determine recommendations for setting process parameter values to achieve desired target product quality parameter values. Finally, the computer system 930 can be configured to additionally train the trained prediction model using further training data. This means, in particular, that continuous training of the prediction model can be implemented.

| List of reference signs | |
|---|---|
| 100 | process parameter values |
| 120 | trained prediction model |
| 121 | data cleaning module |
| 122 | data aggregation module |
| 123 | feature extraction module |
| 124 | data normalization module |
| 125 | principal component analysis module |
| 126 | machine learning module |
| 127 | normalization module |
| 130 | predicted product quality data |
| 200 | training process parameter values |
| 210 | untrained prediction module |
| 211 | data cleaning module |
| 212 | data aggregation module |
| 213 | feature extraction module |
| 214 | data normalization module |

-continued

| List of reference signs | |
| --- | --- |
| 215 | principal component analysis module |
| 216 | machine learning module |
| 217 | data normalization module |
| 240 | measured training product quality parameter values |
| 245 | training dataset |
| 250 | a priori additional information |
| 251 | a priori additional information (data cleaning) |
| 252 | a priori additional information (data aggregation) |
| 253 | a priori additional information (feature extraction) |
| 254 | a priori additional information (data normalization) |
| 255 | a priori additional information (principal component analysis) |
| 256 | a priori additional information (machine learning) |
| 257 | a priori additional information (data normalization) |
| 340 | measured product quality parameter values |
| 360 | classification function |
| 362 | anomaly event |
| 420 | additionally trained prediction model |
| 421 | data cleaning module |
| 422 | data aggregation module |
| 423 | feature extraction module |
| 424 | data normalization module |
| 425 | principal component analysis module |
| 426 | neural network module |
| 427 | normalization module |
| 460 | classification function |
| 462 | input |
| 464 | output |
| 500 | process parameter values |
| 501 | selection algorithm |
| 502 | controllable process parameters |
| 503 | feature elimination algorithm |
| 504 | controllable process parameters (influence on quality prediction) |
| 530 | product quality parameter values |
| 551 | information about production plant |
| 555 | statistical measure |
| 560 | scalar function |
| 580 | desired product quality parameter values |
| 590 | optimization algorithm |
| 591 | iterative adjustment |
| 592 | recommended process parameter values |
| 593 | constraints |
| 594 | input function |
| 596 | output function |
| 598 | user interface |
| 600 | process parameter values |
| 640 | product quality parameter values |
| 700 | measured product quality parameter value |
| 730 | predicted product quality parameter value |
| 735 | confidence interval |
| 820 | Input module |
| 821 | product quality parameter value |
| 822 | tolerance range |
| 840 | output module |
| 842 | recommended process parameter value |
| 843 | used process parameter values |
| 900 | production plant |
| 910 | reactant |
| 912 | reactant |
| 920 | product |
| 930 | computer system |
| 932 | processor |
| 934 | memory |
| 936 | user interface |
| 938 | communication interface |
| 942 | control system |
| 944 | memory |
| 946 | sensors |
| 950 | quality analysis system |
| 952 | computer system |
| 954 | memory |

What is claimed is:

1. A method for training a machine learning module of a computer-implemented prediction model for predicting product quality parameter values for one or more quality parameters of a chemical product produced by a chemical production plant, wherein the production plant comprises a plurality of sensors, which are each configured to acquire, during the operation of the production plant, process parameter values for one or more process parameters of a chemical process carried out by the production plant for producing the chemical product, the method comprising:

providing training data, wherein the training data for a plurality of product units produced by the production plant comprises product quality parameter values determined for each of one or more quality parameters of the respective product unit as training product quality parameter values, wherein the training product quality parameter values are each assigned a production time of the product unit for which they were determined, wherein the training data further comprises a plurality of process parameter values from each of the sensors as training process parameter values, which were acquired during the production of the product units for which the training product quality parameter values were determined, wherein the training process parameter values are each assigned an acquisition time and an identifier of the acquiring sensor;

providing a priori information about the production plant and the process carried out by the production plant, wherein the a priori information includes chronological sequence information about a chronological sequence of the process carried out within the production plant;

determining for each of the sensors a sensor-specific time shift between an acquisition time of one of the training process parameter values acquired by the corresponding sensor and a production time of the product unit, during the production of which the corresponding training process parameter value was acquired, the determination being carried out in each case using the chronological sequence information, with the determined sensor-specific time shifts of the sensors being assigned in each case to the training process parameter values acquired by the respective sensor;

assigning the training process parameter values to the one or more training product quality parameter values of one of the product units, during the production process of which the respective training process parameter value was acquired;

using the acquisition time of the respective training process parameter value, the sensor-specific time shift of the sensor acquiring the respective training process parameter value, and the production time of the respective product unit; and training the machine learning module using the training process parameter values and training product quality parameter values assigned to each other, wherein the respective training product quality parameter values are used to provide output data and the respective assigned training process parameter values are used to provide input data of the machine learning module for the training;

wherein the sensor-specific time shifts of one or more of the sensors are dependent on training process parameter values which have been detected by one or more sensors downstream in the process sequence, and the corresponding training process parameter values are used in each case for determining the respective sensor-specific time shifts dependent on them.

2. The method of claim 1, wherein the production times of the product units each concerns a completion time of the process carried out by the production plant for producing the corresponding product unit.

3. The method of claim 1, wherein the method further comprises cleaning the training process parameter values provided, wherein the cleaning comprises one or more of:

removing outlier values from the training process parameter values;

removing non-physical values from the training process parameter values; and adding missing training process parameter values, wherein in order to identify missing training process parameters the training data is checked for completeness using a priori completeness information, which defines from which sensors of the production plant and for which process parameters the training data should include training process parameter values.

4. The method of claim 1, wherein the method further comprises aggregating the training process parameter values for one or more sensors acquired by the respective sensor, wherein the corresponding training process parameter values are assigned to an aggregation time window using the respectively assigned acquisition times, with process parameter values associated to a common aggregation time window each being aggregated.

5. The method of claim 4, wherein the sensor-specific time shifts of the sensors, the training process parameter values of which are aggregated, are determined for each of the aggregation windows and are assigned to the aggregated training process parameter values of the respective aggregation window.

6. The method of claim 1, wherein the provision of input data further comprises extracting statistical feature values and/or frequency feature values from the training process parameter values for training the machine learning module.

7. The method of claim 6, wherein the provision of input data further comprises scaling the extracted feature values for training the machine learning module.

8. The method of claim 7, wherein the provision of output data comprises scaling the training product quality parameter values.

9. The method of claim 6, wherein the provision of input data further comprises reducing the dimensionality of extracted feature values using a transformation of the extracted feature values.

10. The method of claim 1, wherein the method further comprises assigning weighting factors of the machine learning module, which are used for weighting extracted features based on training process parameters which have been acquired for identical process parameters of sensors arranged within the same subsystem of the production plant, to a common weighting group, wherein weighting factors of the same weighting group are equated and trained together.

11. The method of claim 1, wherein providing one or more application-specific loss functions for use by the machine-learning module, in order to weight specific prediction errors selectively more strongly than other prediction errors in the course of the training.

12. The method of claim 1, wherein further comprising providing test data as a second statistically independent random sample, including test process parameter values and test product quality parameter values, wherein the test data is used for testing the prediction accuracy of the prediction model with the machine-learning module trained with the training data, wherein the testing comprises predicting product quality parameter values using the test process parameter values and comparing the resulting predicted product quality parameter values with the expected test product quality parameter values, wherein in the case of greatly varying operating conditions of the production plant under which the training data and test data are created, the training data and test data are compiled in such a way that the different operating conditions are represented in equal proportions in the training data and test data.

13. The method of claim 1, wherein the machine learning module comprises an artificial neural network.

14. The method of claim 1, wherein the production plant is a polymer production plant for producing a polymer product.

15. A method for predicting product quality parameter values for one or more quality parameters of a chemical product produced by a chemical production plant using a computer-implemented prediction model having a machine learning module trained according to claim 1, wherein the production plant comprises a plurality of sensors, which are each configured to acquire process parameter values for one or more process parameters of a chemical process for producing the chemical product carried out by the production plant in the operation of the production plant, the method comprising:

providing a plurality of process parameter values acquired by the sensors in the operation of the production plant, wherein the process parameter values are each assigned an acquisition time and an identifier of the acquiring sensor;

providing a priori information about the production plant and the process carried out by the production plant, wherein the a priori information includes chronological sequence information about a chronological sequence of the process carried out within the production plant;

determining for each of the sensors a sensor-specific time shift between the acquisition times of the process parameter values acquired by the corresponding sensor and a production time of the product unit, for which product quality parameter values are to be predicted and during the production of which the respective process parameter values were acquired, the determination being carried out in each case using the chronological sequence information, with the determined sensor-specific time shifts of the sensors being assigned in each case to the process parameter values acquired by the respective sensor;

assigning to each other the process parameter values that were acquired during the production of the same product unit, wherein the process parameter values to be aggregated are determined using the sensor-specific time shift, using each of the assigned process parameter values to provide input data of the trained machine learning module to predict one or more product quality parameter values;

receiving one or more product quality parameter values predicted using the trained machine learning module for the product unit, during the production of which the product quality parameter values used to provide the input data were acquired, as an output of the prediction model.

16. The method of claim 15, further comprising an additional training of the trained machine learning module, the additional training comprising:

providing product quality parameter values, which were determined using one or more of the product units produced by the production plant for which product quality parameter values have been predicted, as additional training product quality parameter values;

assigning the provided process parameter values that were acquired during production of the respective product units, for which the additional training product quality parameter values are provided, as additional training process parameter values to the additional training product quality parameter values, wherein the process parameter values that were acquired during the production of the respective product units are determined using the acquisition time of the respective process parameter values, the sensor-specific time shifts of the sensors acquiring the respective process parameter values, and the production times of the respective product units produced; and additionally training the machine learning module using the additional training product quality parameter values and the assigned additional training process parameter values, wherein the respective additional training product quality parameter values are used to provide additional output data and the respectively assigned additional training process parameter values are used to provide additional input data of the machine learning module for the additional training.

17. The method of claim 15, wherein the method further comprises detecting anomalies in the predicted product quality parameter values, the detection of the anomalies comprising:

comparing the product quality parameter values determined using the product units produced by the production plant with the product quality parameter values predicted for the respective product unit;

identifying the predicted product quality parameter values as anomalies if a deviation between the predicted and determined product quality parameter values for the same product unit meets a predefined criterion; and outputting an anomaly alert if one or more of the predicted product quality parameter values are identified as anomalies.

18. The method of claim 17, wherein the predefined criterion comprises exceeding a predefined first threshold value.

19. The method of claim 18, wherein the satisfying the predefined criterion comprises a confidence level of the deviation falling below a predefined second threshold value.

20. The method of claim 16, wherein a precondition for initiating an additional training of the trained machine learning module comprises identifying one or more of the predicted product quality parameter values as an anomaly.

21. The method of claim 16, wherein a precondition for initiating an additional training of the trained machine learning module comprises accumulating additional training product quality parameter values and additional training process parameter values for a predefined number of product units produced.

22. The method of claim 15 further comprising:

selecting from the process parameters, for which the sensors of the production plant acquire process parameter values, a group of controllable process parameters which can be controlled by a central control system of the production plant; and identifying a subgroup of the controllable process parameters, the variation of which most strongly affects the product quality parameter values predicted using the trained machine learning module, wherein the identification comprises varying different subgroups of the controllable process parameters and comparing the resulting predicted product quality parameter values.

23. The method of claim 22 further comprising:

receiving a set of target product quality parameter values for one or more product quality parameters of the product to be produced by the production plant;

determining process parameter values for the controllable process parameters of the subgroup for which a total deviation between the product quality parameter values predicted using the trained machine learning module and the received target product quality parameters falls below a predefined third threshold value, wherein the determination comprises a variation of the controllable process parameters of the subgroup using a non-linear minimization procedure; and outputting the determined process parameter values as a recommendation for adjusting the controllable process parameters using the control system for producing product units of the product to be produced which exhibit the target product quality parameter values.

24. A computer system for training a machine learning module of a computer-implemented prediction model for predicting product quality parameter values for one or more quality parameters of a chemical product produced by a chemical production plant, wherein the production plant comprises a plurality of sensors, which are each configured to acquire, during the operation of the production plant, process parameter values for one or more process parameters of a chemical process carried out by the production plant for producing the chemical product, wherein the computer system comprises a processor and a memory, wherein the prediction model with the machine-learning module is stored in the memory, wherein program instructions are also stored in the memory, wherein execution of the program instructions by the processor causes the processor to carry out a method comprising:

providing training data, wherein the training data for a plurality of product units produced by the production plant comprises product quality parameter values determined for each of one or more quality parameters of the respective product unit as training product quality parameter values, wherein the training product quality parameter values are each assigned a production time of the product unit for which they were determined, wherein the training data further comprises a plurality of process parameter values from each of the sensors as training process parameter values, which were acquired during the production of the product units for which the training product quality parameter values were determined, wherein the training process parameter values are each assigned an acquisition time and an identifier of the acquiring sensor;

providing a priori information about the production plant and the process carried out by the production plant, wherein the a priori information includes chronological sequence information about a chronological sequence of the process carried out within the production plant;

determining for each of the sensors, a sensor-specific time shift between an acquisition time of one of the training process parameter values acquired by the corresponding sensor and a production time of the product unit, during the production of which the corresponding training process parameter value was acquired, the determination being carried out in each case using the chronological sequence information, with the determined sensor-specific time shifts of the sensors being assigned in each case to the training process parameter values acquired by the respective sensor;

assigning the training process parameter values to the one or more training product quality parameter values of one of the product units, during the production process of which the respective training process parameter value was acquired;

using the acquisition time of the respective training process parameter value, the sensor-specific time shift of the sensor acquiring the respective training process parameter value, and the production time of the respective product unit; and training the machine learning module using the training process parameter values and training product quality parameter values assigned to each other, wherein the respective training product quality parameter values are used to provide output data and the respective assigned training process parameter values are used to provide input data of the machine learning module for the training;

wherein the sensor-specific time shifts of one or more of the sensors are dependent on training process parameter values which have been detected by one or more sensors downstream in the process sequence, and the corresponding training process parameter values are used in each case for determining the respective sensor-specific time shifts dependent on them.

25. A computer system for predicting product quality parameter values for one or more quality parameters of a chemical product produced by a chemical production plant, using a computer-implemented prediction model having a machine learning module trained according to claim 1, wherein the production plant comprises a plurality of sensors which are each configured to acquire process parameter values for one or more process parameters of a chemical process for producing the chemical product carried out by the production plant in the operation of the production plant comprising:

a processor; and a memory, wherein the prediction model with the machine-learning module is stored in the memory, wherein program instructions are also stored in the memory, wherein execution of the program instructions by the processor causes the processor to carry out a method comprising:

providing a plurality of process parameter values acquired by the sensors in the operation of the production plant, wherein the process parameter values are each assigned an acquisition time and an identifier of the acquiring sensor;

providing a priori information about the production plant and the process carried out by the production plant, wherein the a priori information includes chronological sequence information about a chronological sequence of the process carried out within the production plant;

determining for each of the sensors a sensor-specific time shift between the acquisition times of the process parameter values acquired by the corresponding sensor and a production time of a product unit for which product quality parameter values are to be predicted, and during the production of which the respective process parameter values were acquired, the determination being carried out in each case using the chronological sequence information, with the determined sensor-specific time shifts of the sensors being assigned in each case to the process parameter values acquired by the respective sensor;

assigning to each other the process parameter values that were acquired during the production of the same product unit, wherein the process parameter values to be aggregated are determined using the sensor-specific time shift;

using each of the assigned process parameter values to provide input data of the trained machine learning module to predict one or more product quality parameter values; and receiving one or more product quality parameter values predicted using the trained machine learning module for the product unit, during the production of which the product quality parameter values used to provide the input data were acquired, as an output of the prediction model.

* * * * *